(12) United States Patent
Sigler et al.

(10) Patent No.: US 11,506,677 B2
(45) Date of Patent: Nov. 22, 2022

(54) SYSTEMS AND METHODS FOR PIPETTE ROBOTS

(71) Applicant: Opentrons LabWorks Inc., Brooklyn, NY (US)

(72) Inventors: Andrew Sigler, Brooklyn, NY (US); Taylor Schlaff Goodman, New York, NY (US); Nicholas Pease Starno, Fort Pierce, FL (US); Jonathan Preston Badal, Brooklyn, NY (US)

(73) Assignee: Opentrons Labworks Inc., Brooklyn, NY (US)

( * ) Notice: Subject to any disclaimer, the term of this patent is extended or adjusted under 35 U.S.C. 154(b) by 180 days.

(21) Appl. No.: 16/722,749

(22) Filed: Dec. 20, 2019

(65) Prior Publication Data

US 2020/0200779 A1  Jun. 25, 2020

Related U.S. Application Data

(60) Provisional application No. 62/784,135, filed on Dec. 21, 2018.

(51) Int. Cl.
*G01N 35/00* (2006.01)
*G01N 35/10* (2006.01)
*B01L 3/02* (2006.01)

(52) U.S. Cl.
CPC ........ *G01N 35/0099* (2013.01); *B01L 3/0227* (2013.01); *B01L 3/0237* (2013.01); *G01N 35/00693* (2013.01); *G01N 35/1011* (2013.01)

(58) Field of Classification Search
None
See application file for complete search history.

(56) References Cited

U.S. PATENT DOCUMENTS 5,055,263 A * 10/1991 Meltzer .............. G01N 35/1072
422/561
5,306,510 A *  4/1994 Meltzer .............. G01N 35/1072
422/561

* cited by examiner

*Primary Examiner* — Brian R Gordon
(74) *Attorney, Agent, or Firm* — Orrick, Herrington & Sutcliffe LLP

(57) ABSTRACT

Systems and methods applicable, for instance, to pipette robots. A pipette robot can perform one or more operations regarding deck calibration, one or more operations regarding pipette tip/probe calibration, one or more operations regarding pipette tip pick up, and/or one or more operations regarding tip ejection.

4 Claims, 46 Drawing Sheets

SYSTEMS AND METHODS FOR PIPETTE ROBOTS

CROSS-REFERENCE TO RELATED APPLICATIONS

This application claims priority to U.S. Provisional Patent Application Ser. No. 62/784,135, filed on Dec. 21, 2018, the contents of which are incorporated herein by reference in their entirety and for all purposes.

FIELD OF THE INVENTION

The present disclosure generally relates to system and methods which are applicable to pipette robots.

BACKGROUND OF THE INVENTION

A pipette robot can include an XYZ gantry, a pipette which is attached to the XYZ gantry, and a deck upon which labware can be situated. The pipette robot can perform various operations with respect to the labware, for instance accessing (e.g., aspirating and dispensing) blood and other liquids held by the labware. For various applications, there can be call that the pipette robot achieve high accuracy (e.g., sub-millimeter accuracy) when performing such liquid access.

Liquid access by the pipette robot can involve the robot moving the XYZ gantry about a rigid frame. Unfortunately, however, variances in manufacturing and shifts during shipment can result in: 1) a deck or gantry that does not exactly match dimensional specifications; or 2) a deck that is offset from its intended location within the robot frame, and which therefore becomes misaligned from the XYZ gantry. Accordingly, for instance, when traveling about the Y-axis of the gantry, the pipette robot may not travel parallel to the Y-axis of the frame. As such, it can be difficult for the pipette robot to achieve accuracy when accessing liquids. Additional reasons that it can be difficult for the pipette robot to achieve accuracy when accessing liquids include variances in manufacturing, shifts during shipping, user configuration, interchanging of pipettes, and tip variation, all of which contribute to shifts in pipette tip location relative to the fixed robot frame.

Moreover, among the operations performed by a pipette robot can be picking up pipette tips and ejecting pipette tips. In order to pick up a pipette tip, the pipette robot can travel a pipette assembly downward along a Z-axis such that the pipette assembly contacts the tip, and the tip becomes attached to the assembly. However, performing this operation can be challenging. In a first aspect, the distance which the robot is to travel the pipette assembly depends on various factors, including the length of the tip. Further, there is call for the pipette assembly to be pressed against the tip with appropriate force. In particular, insufficient force can lead to air seal leaks while excessive force can damage the tip. In addition to this, variations in robot hardware, manufacturing, and/or brands of utilized tips can make it difficult for a pipette robot to determine how far to travel in the Z-axis to successfully contact and pick up a tip. With further regard to pipette tip pick up and ejection, it is noted that, according to conventional approaches, pipette robots typically utilize pipettes which have two motorized systems: a first motorized system for aspirating and dispensing liquid, and a second, separate motorized system which is dedicated to ejecting tips.

As such, there is call for technologies which are applicable to overcoming the aforementioned deficiencies of conventional pipette robot approaches.

DETAILED DESCRIPTION

Figure 1A:
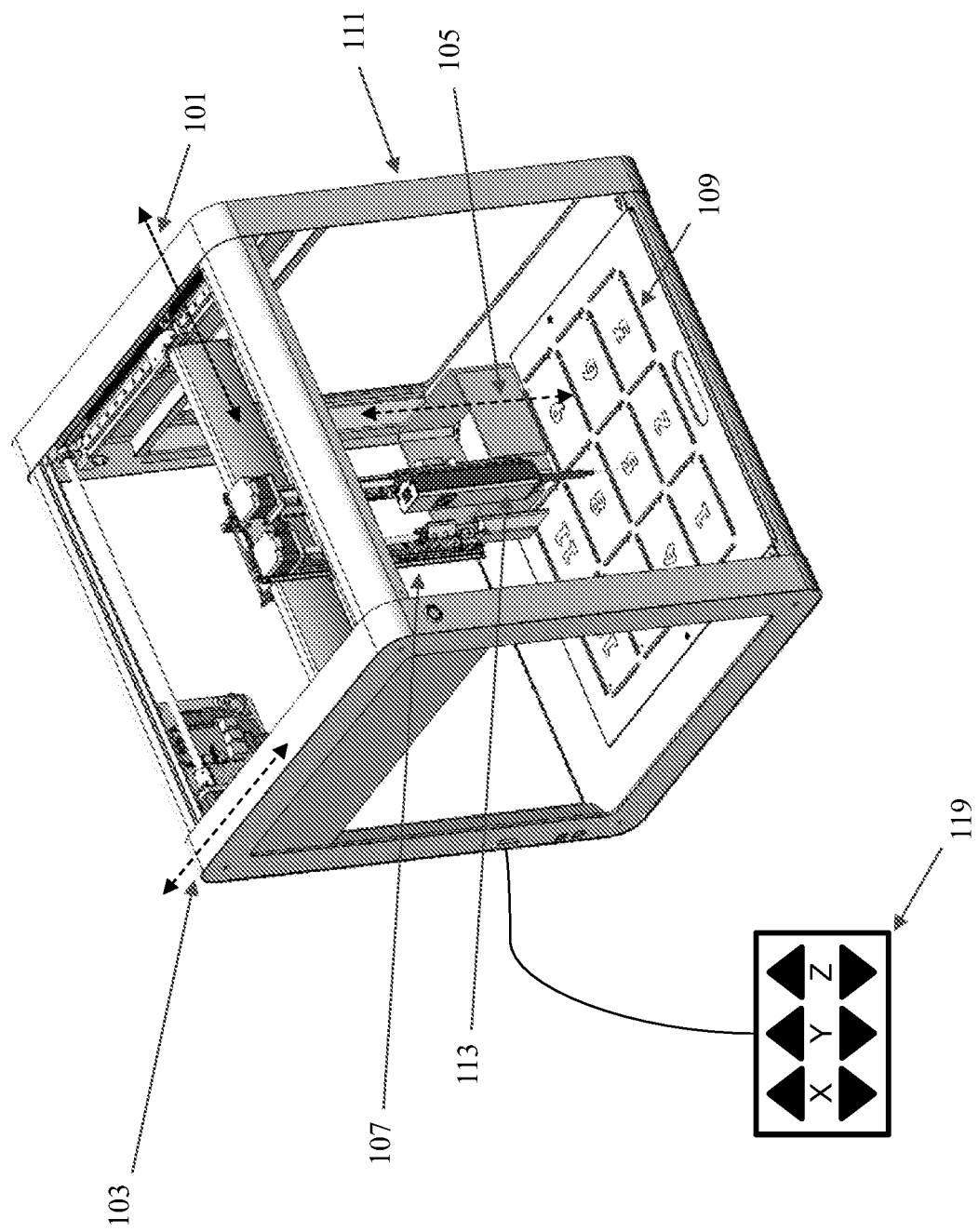
FIG. 1A shows a pipette robot, according to various embodiments.
Figure 1B:
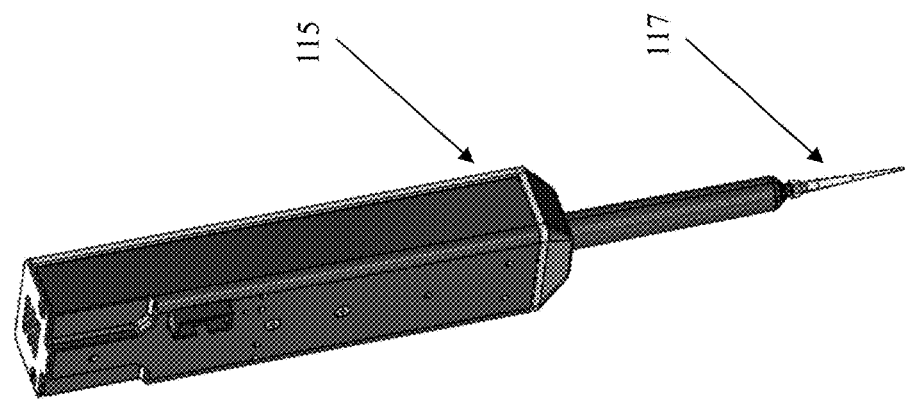
FIG. 1B shows a pipette, according to various embodiments.

According to various embodiments, there are provided systems and methods applicable, for instance, to pipette robots. Such systems and methods include ones by which a pipette robot can calibrate a deck thereof. Such systems and methods also include ones by which a pipette robot can calibrate a pipette to which a tip is attached. Such systems and methods further include ones by which a pipette robot can pick up tips, and ones by which a pipette robot can eject tips. Shown in FIG. 1A is an example pipette robot according to various embodiments. Shown in FIG. 1A are an X-axis 101, a Y-axis 103, and a Z-axis 105. Further shown in FIG. 1A are a gantry 107, a fixed deck 109, a robot frame 111, and a pipette 113 which is attached to the gantry. Then, FIG. 1B shows a zoomed-in view of the pipette, including a pipette assembly 115 and a pipette tip 117, such as a press-on pipette tip. Various aspects will now be discussed in greater detail.

Deck Calibration

With further reference to FIG. 1A, in various embodiments, using a multi-point deck calibration process, the pipette robot can calibrate the moving X, Y, and Z axes (101/103/105) of the gantry 107 to the fixed deck 109 on the robot frame 111 in a rapid manner. Subsequently, the pipette robot can use the measured points to calculate deck shift, scale, rotation, and tilt. During liquid handling operations, the pipette robot can use these calculations to automatically adjust for deck shift, scale, rotation, and tilt relative to the XYZ gantry. Accordingly, for instance, the pipette robot can ascertain the X and Y directions in which the gantry can move in order to travel parallel to the X-axis and Y-axis of the frame.

Figure 2A:
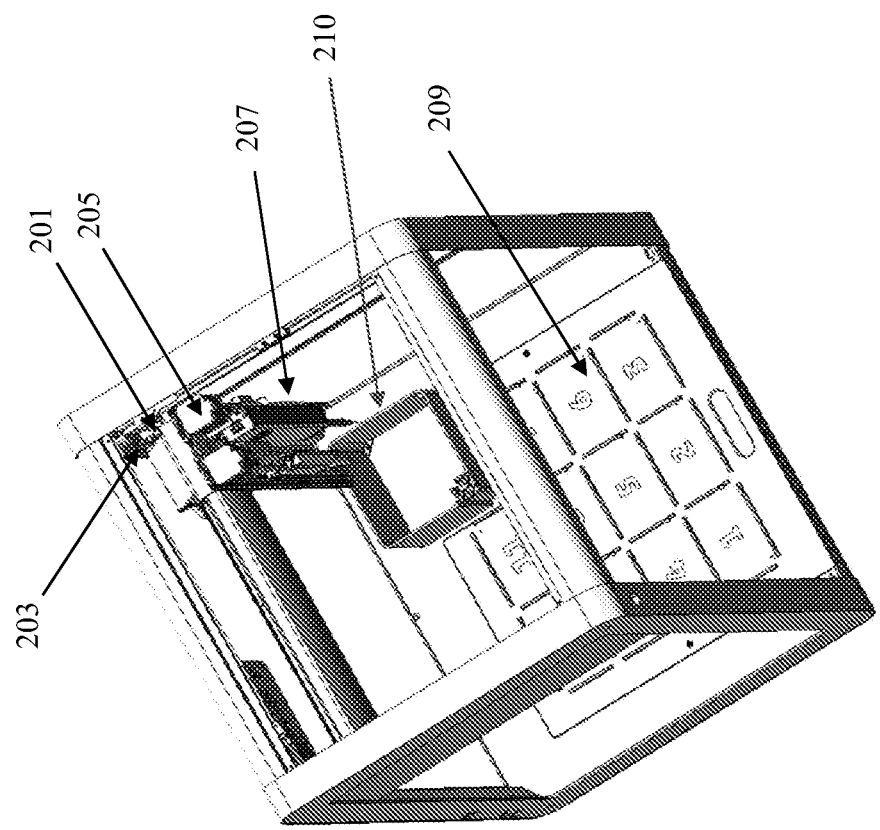
FIG. 2A shows X, Y, and Z frame switches and further elements, according to various embodiments.
Figure 2B:
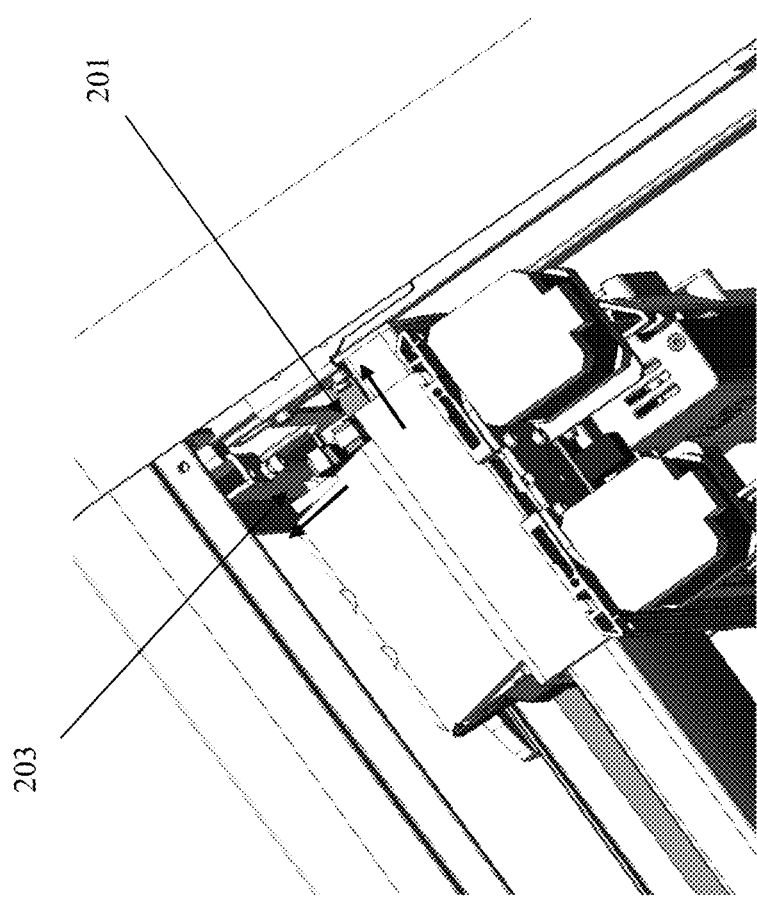
FIG. 2B shows a X frame switch and Y frame switch zoomed-in view, according to various embodiments.
Figure 2C:
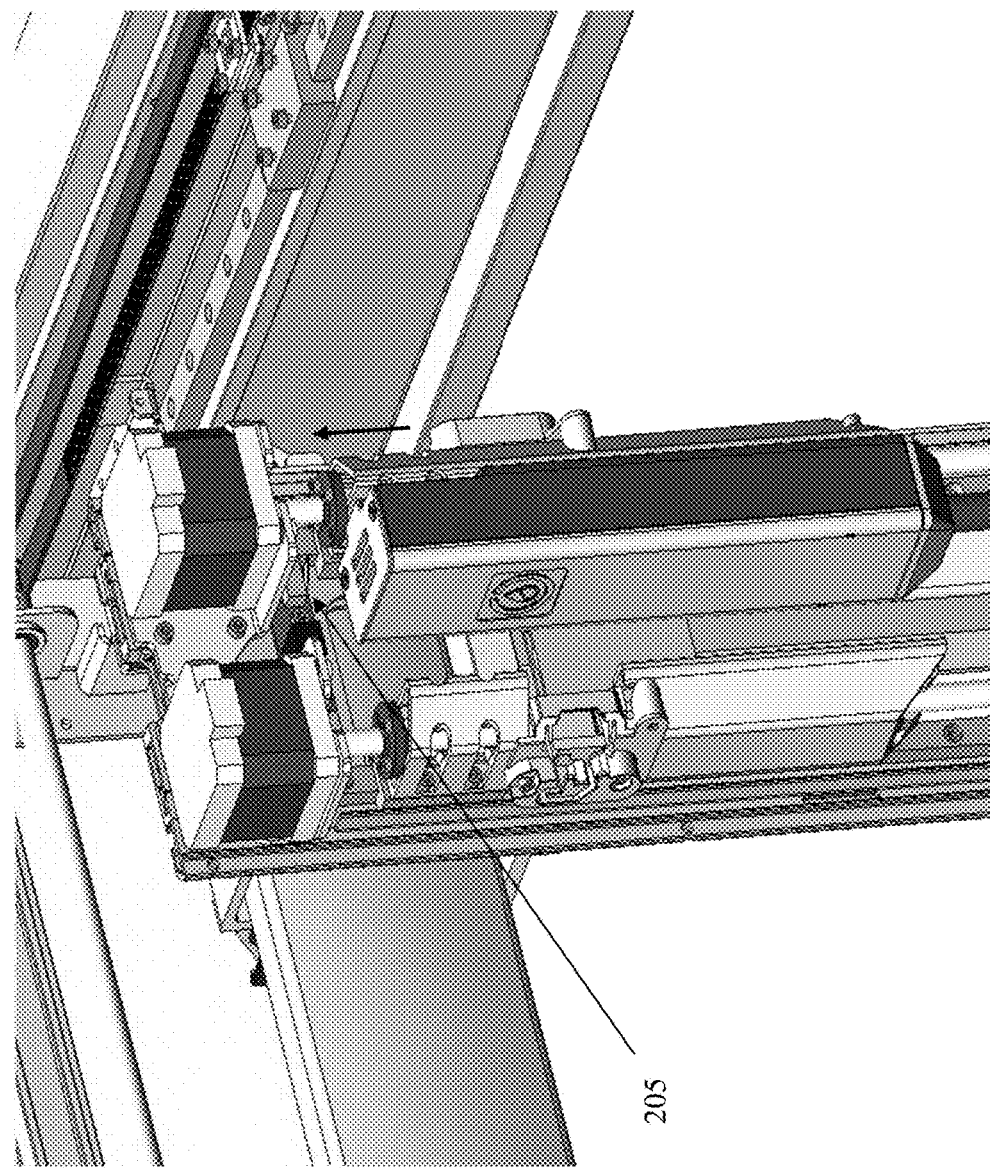
FIG. 2C shows a Z frame switch zoomed in view, according to various embodiments.
Figure 2D:
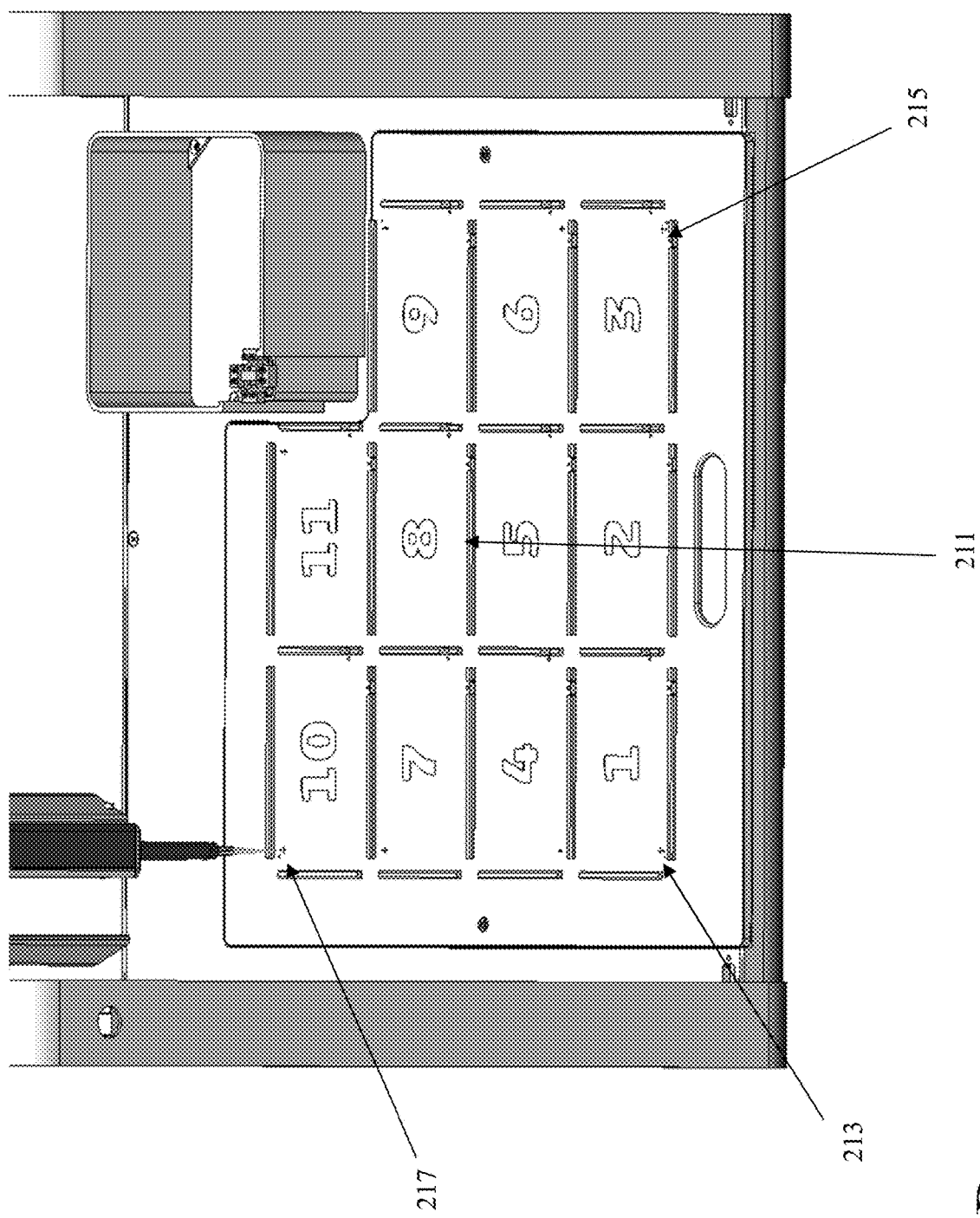
FIG. 2D shows calibration points, according to various embodiments.
Figure 2E:
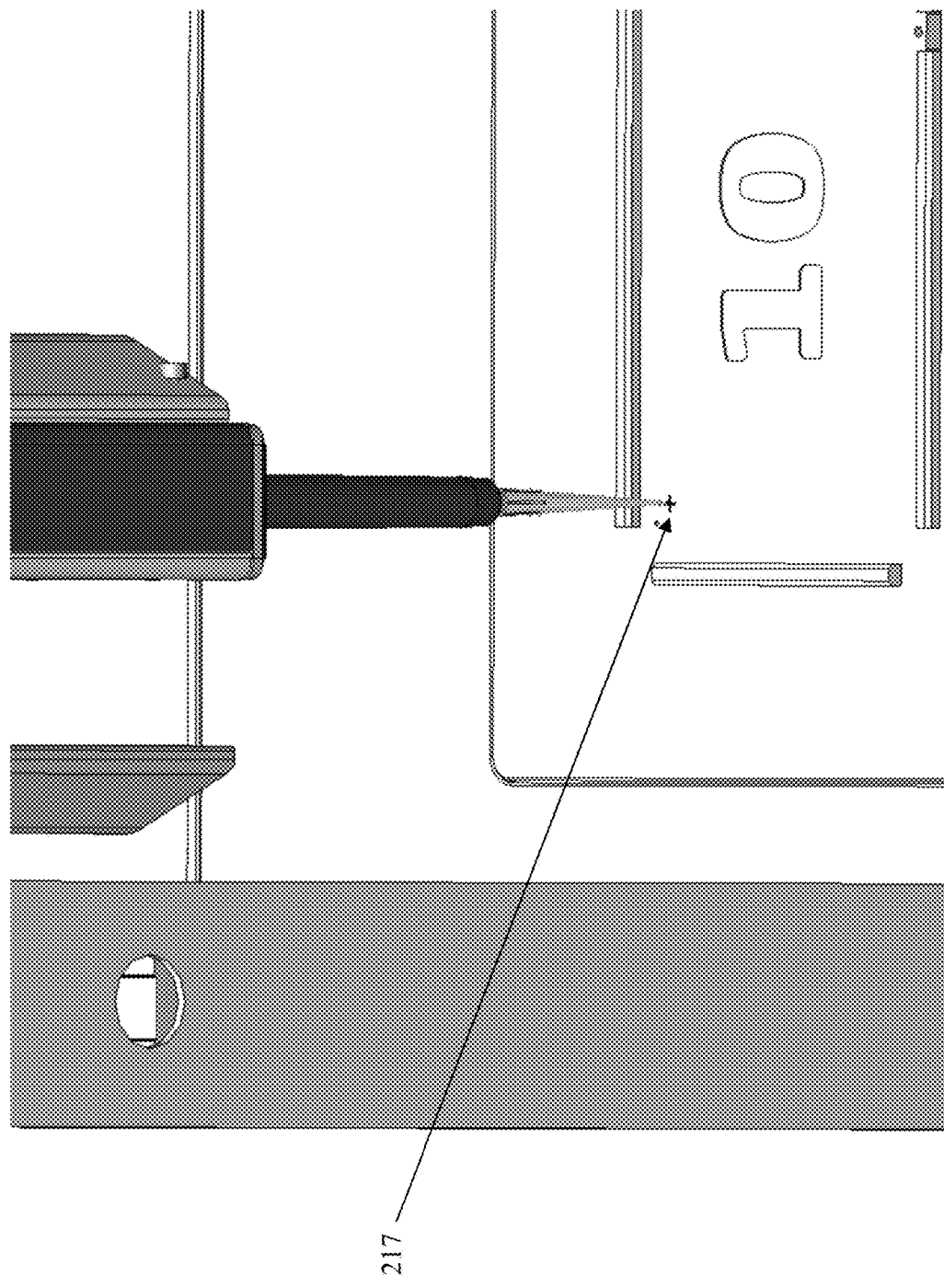
FIG. 2E shows a calibration point 4 zoomed-in view, according to various embodiments.
Figure 2F:
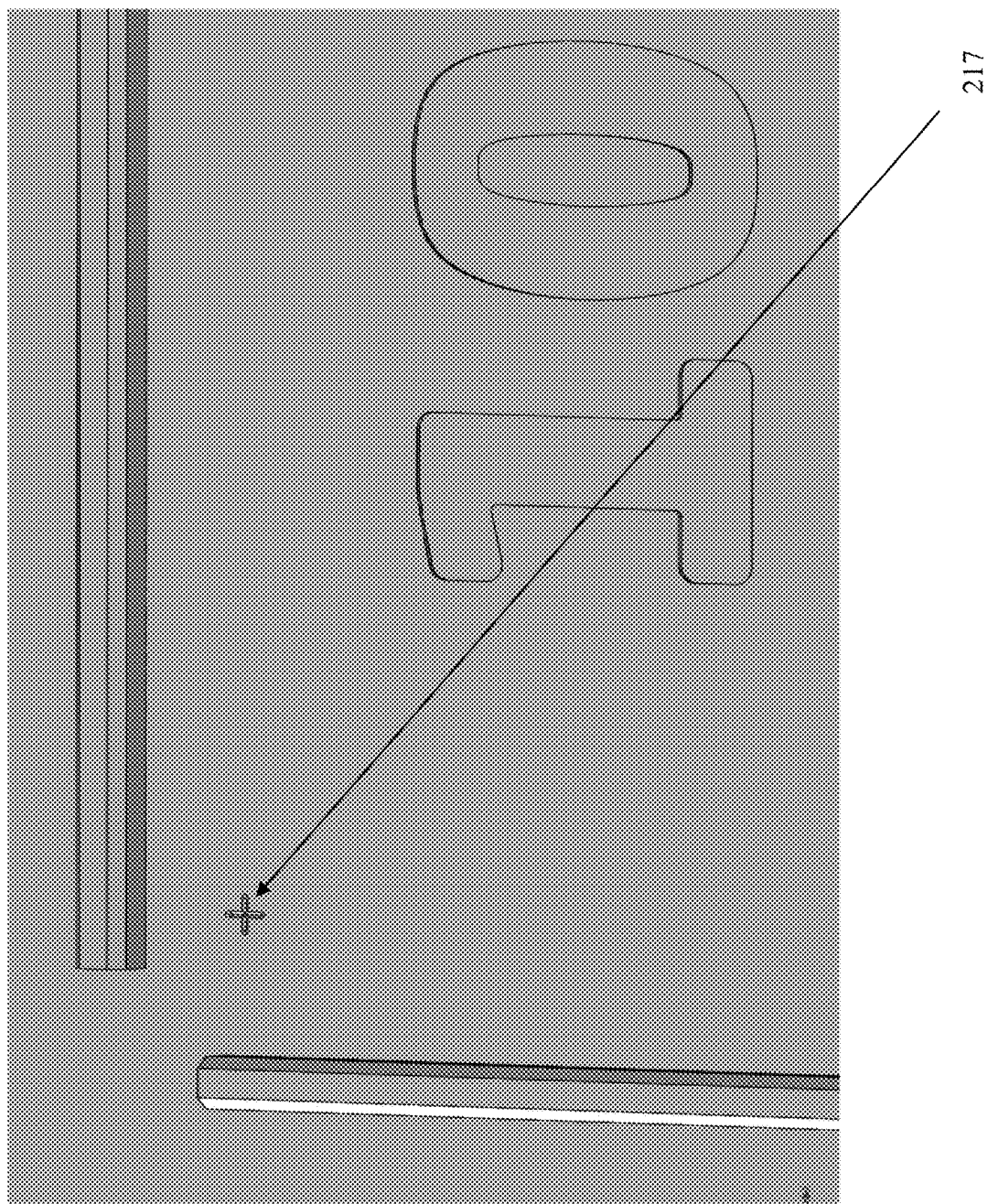
FIG. 2F shows a more-expressly zoomed-in view of calibration point 4, according to various embodiments.
Figure 3:
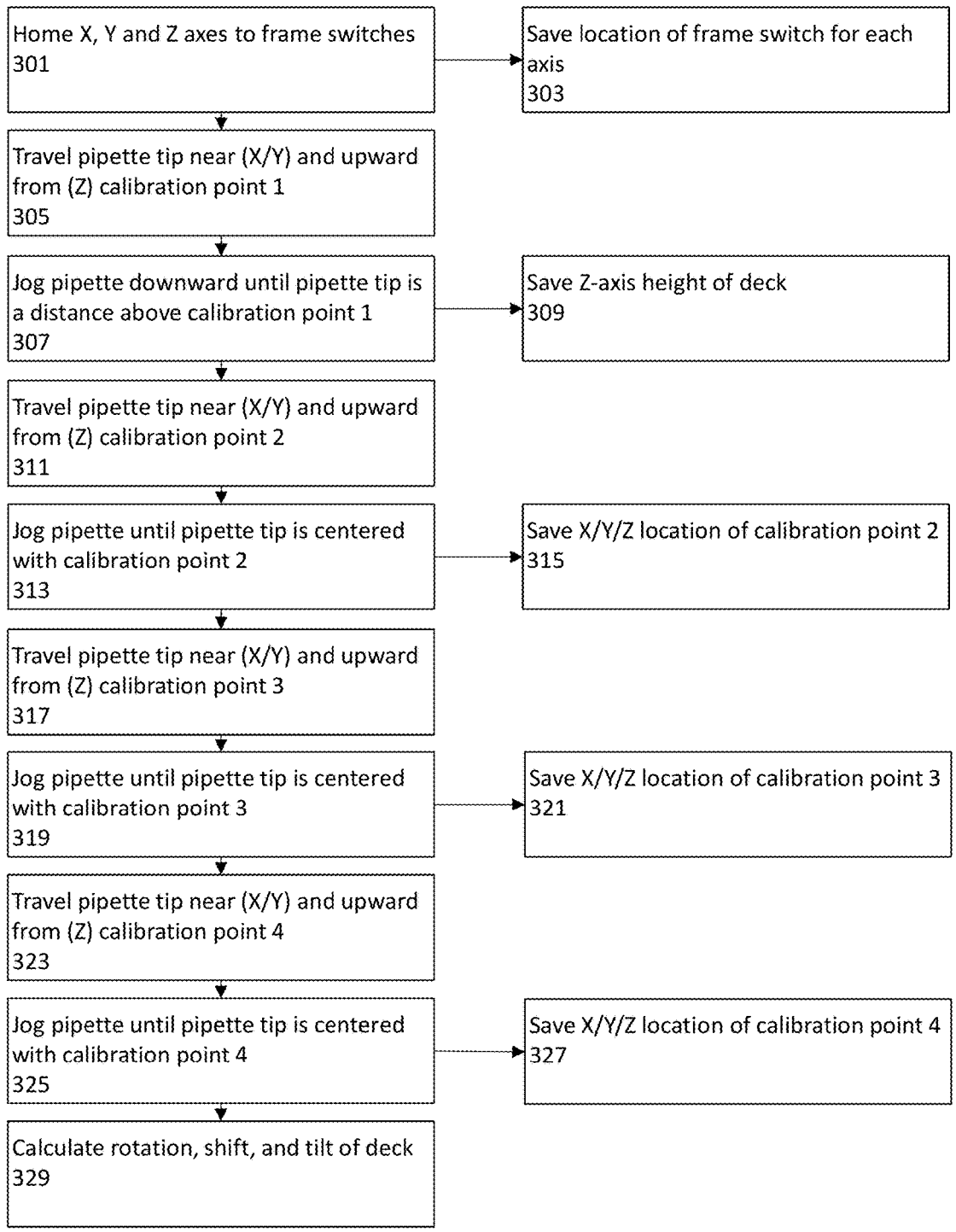
FIG. 3 shows a deck calibration process, according to various embodiments.

The deck calibration process which is performed via the pipette robot utilizes frame switches and calibration points. Shown in FIG. 2A are X frame switch 201, Y frame switch 203, and Z frame switch 205. The frame switches can be implemented using limit switches. Also shown in FIG. 2A are pipette 207 and deck 209. Then, FIG. 2B shows a zoomed-in view of these X and Y frame switches. Likewise, FIG. 2C shows a zoomed-in view of the Z frame switch. Depicted in FIG. 2D are calibration point 1 (211), calibration point 2 (213), calibration point 3 (215), and calibration point 4 (217). As examples, calibration point 1 can be situated at or near the center of the deck, calibration point 2 can be situated at or near the front left corner of the deck, calibration point 3 can be situated at or near the front right corner of the deck, and/or calibration point 4 can be situated at or near the rear left corner of the deck. Then, FIG. 2E shows a zoomed-in view of calibration point 4, while FIG. 2F shows a more-expressly zoomed-in view of calibration point 4.

Turning now to FIGS. 3 and 4A-4G, discussed is the performance of the deck calibration process via the pipette robot, according to various embodiments. The process of FIG. 3 can be performed with a pipette attached to the gantry of the pipette robot, and where a tip has been attached to the pipette.

Figure 4A:
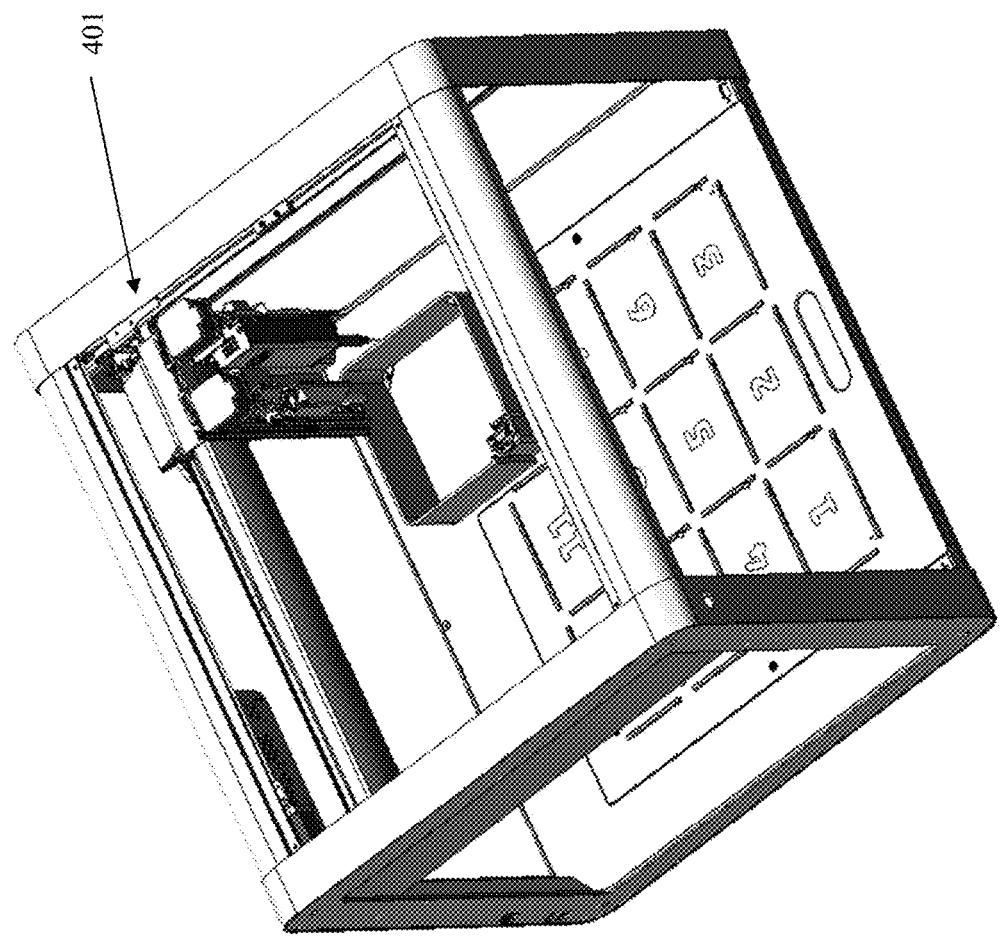
FIG. 4A shows operation 1 of the deck calibration process, according to various embodiments.

At step 301, the pipette robot can home each of the X, Y, and Z axes to a corresponding frame switch. Further, at step 303 the pipette robot can save, for each of the three axes, the location of the frame switch for that axis. Steps 301 and 303 can comprise operation 1 of the deck calibration process, and can be considered to generally regard a homing of the X, Y, and Z axes. Depicted in FIG. 4A is the pipette robot having homed the X, Y, and Z axes 401 via operation 1.

Figure 4B:
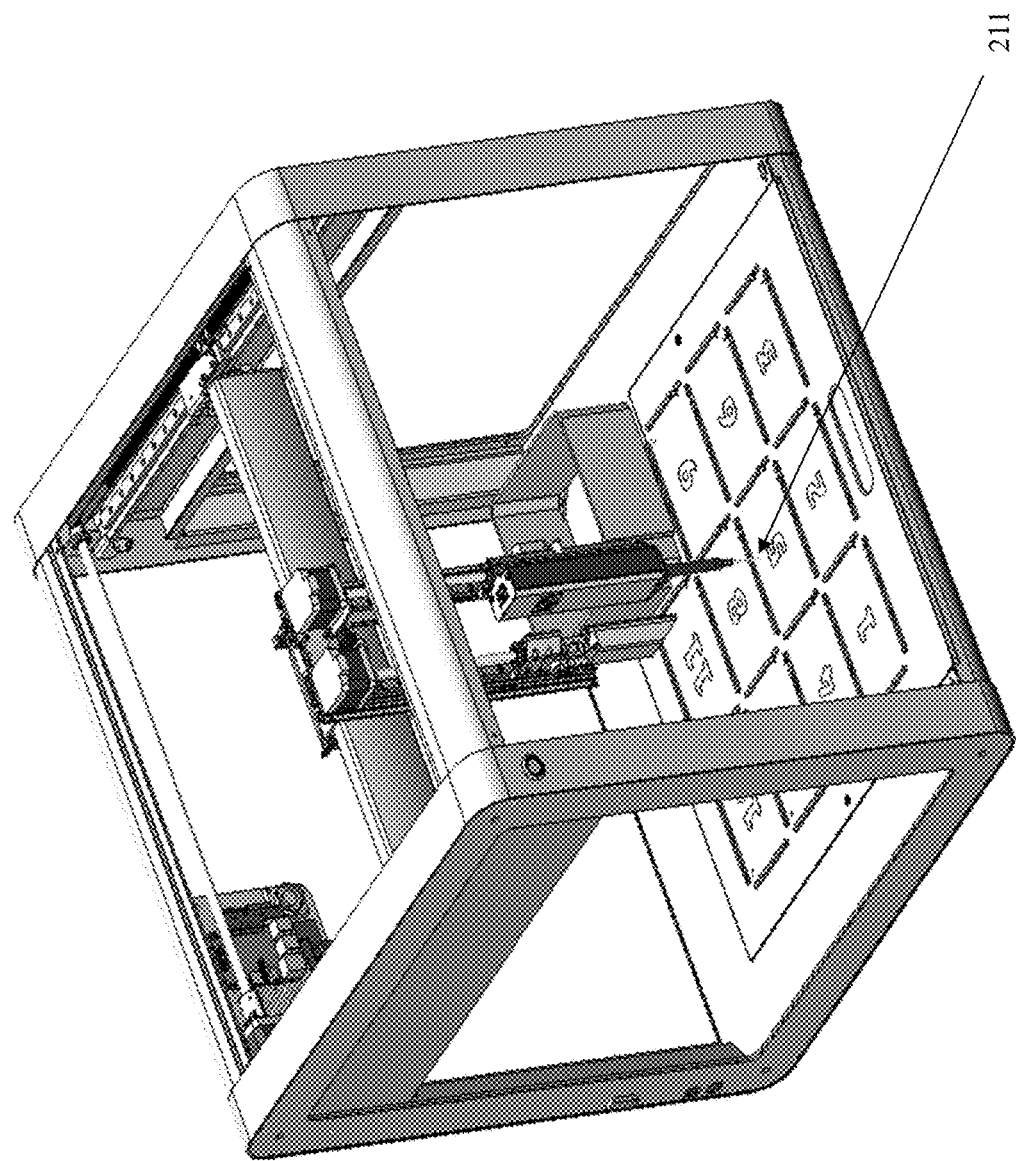
FIG. 4B shows operation 2 of the deck calibration process, according to various embodiments.
Figure 4C:
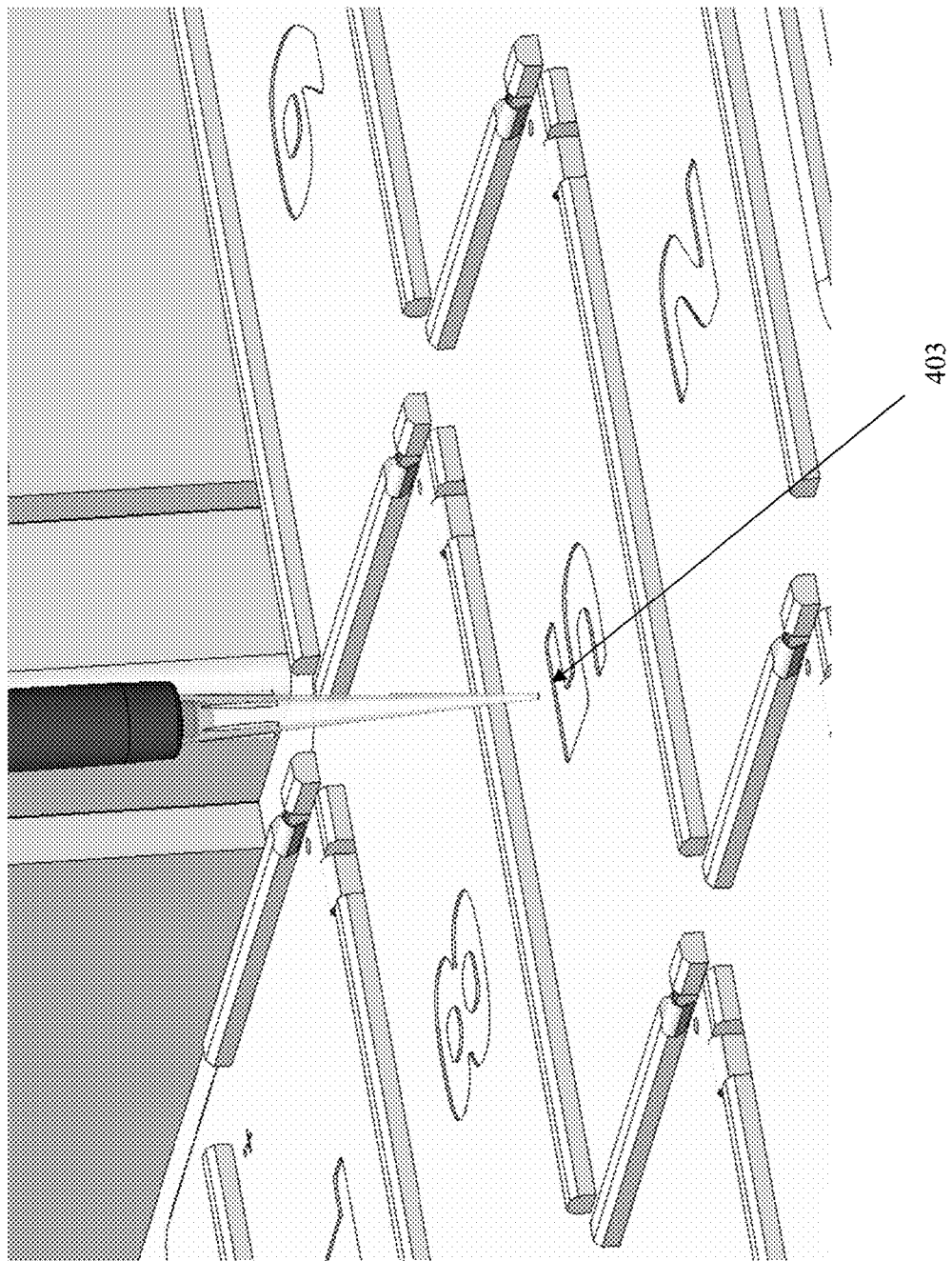
FIG. 4C shows a zoomed-in view of operation 2 of the deck calibration process, according to various embodiments.

Then, at step 305 the pipette robot can travel the pipette tip to a point near calibration point 1 in terms of the X and Y directions (e.g., on order of within 1 cm from calibration point 1, in terms of the X and Y directions), and upward from calibration point 1 in terms of the Z direction (e.g., on order of 1 cm above calibration point 1 relative to the top surface of the deck). At step 307, the pipette can be jogged downward in the Z-axis direction until the pipette tip is a given distance (e.g., 0-0.35 mm) above calibration point 1. At step 309 the pipette robot can save the Z-axis height of the deck, relative to the Z frame switch. Steps 305-309 can comprise operation 2 of the deck calibration process, and can be considered to generally regard a Z-height calibration. Depicted in FIG. 4B is the pipette robot having completed operation 2. Calibration point 1 is shown as element 211 of FIG. 4B. Then, FIG. 4C shows a zoom-in of the pipette robot having completed operation 2. The given distance of 0-0.35 mm discussed in connection with operation 2 is depicted as element 403 of FIG. 4C.

Figure 4D:
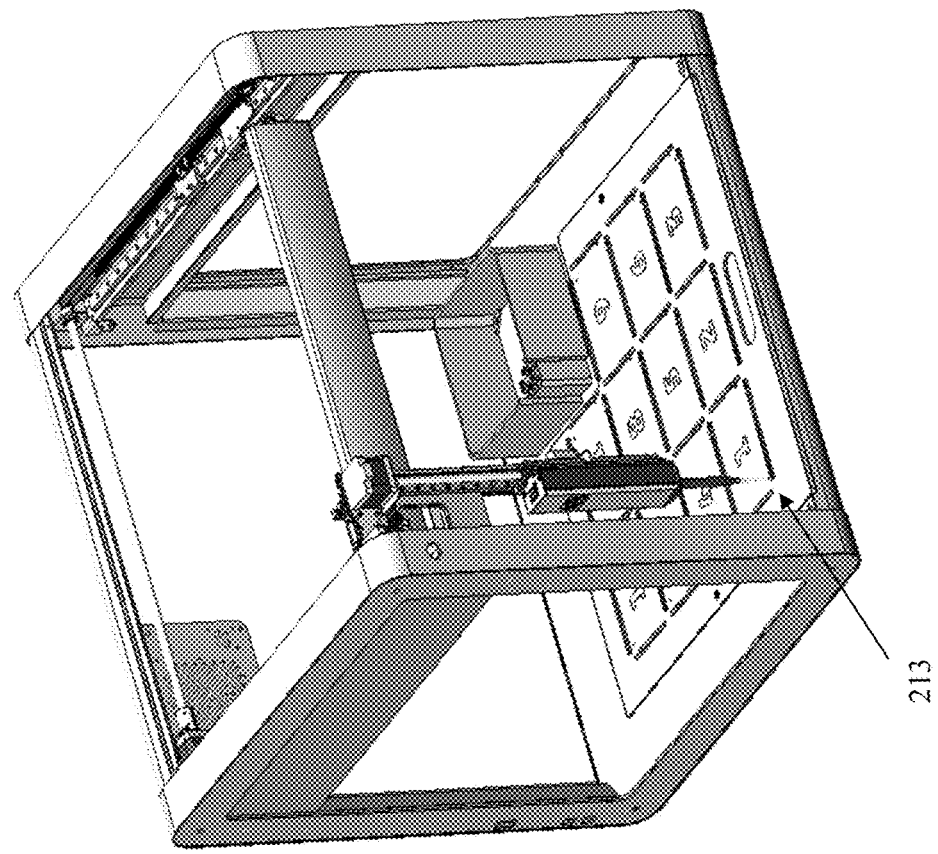
FIG. 4D shows operation 3 of the deck calibration process, according to various embodiments.

At step 311 the pipette robot can travel the pipette tip to a point near calibration point 2 in terms of the X and Y directions (e.g., on order of within 1 cm from calibration point 2, in terms of the X and Y directions), and upward from calibration point 2 in terms of the Z direction (e.g., on order of 1 cm above calibration point 2 relative to the top surface of the deck). At step 313, the pipette can be jogged in the X, Y, and/or Z directions until the pipette tip is directly centered (or nearly centered) with calibration point 2. Then, at step 315 the pipette robot can save the X/Y/Z location of calibration point 2 on the deck, relative to the X, Y, and Z frame switches. Steps 311-315 can comprise operation 3 of the deck calibration process, and can be considered to generally regard an X/Y/Z calibration with respect to calibration point 2. Depicted in FIG. 4D is the pipette robot having completed operation 3. In FIG. 4D, calibration point 2 is shown as element 213.

Figure 4E:
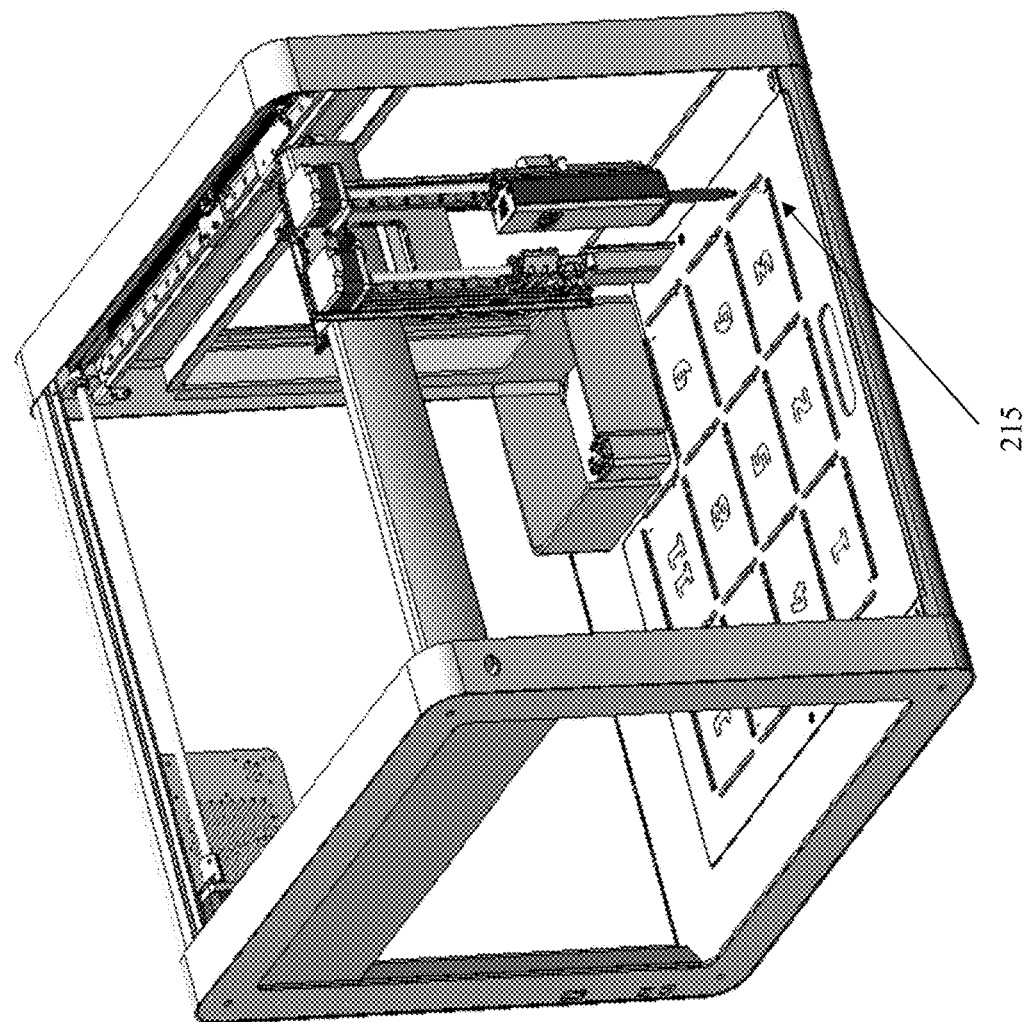
FIG. 4E shows operation 4 of the deck calibration process, according to various embodiments.

Then, at step 317 the pipette robot can travel the pipette tip to a point near calibration point 3 in terms of the X and Y directions (e.g., on order of within 1 cm from calibration point 3, in terms of the X and Y directions), and upward from calibration point 3 in terms of the Z direction (e.g., on order of 1 cm above calibration point 3 relative to the top surface of the deck). At step 319, the pipette can be jogged in the X, Y, and/or Z directions until the pipette tip is directly centered (or nearly directly centered) with calibration point 3. Then, at step 321 the pipette robot can save the X/Y/Z location of calibration point 3 on the deck, relative to the X, Y, and Z frame switches. Steps 317-321 can comprise operation 4 of the deck calibration process, and can be considered to generally regard an X/Y/Z calibration with respect to calibration point 3. Depicted in FIG. 4E is the pipette robot having completed operation 4. In FIG. 4E, calibration point 3 is shown as element 215.

Figure 4F:
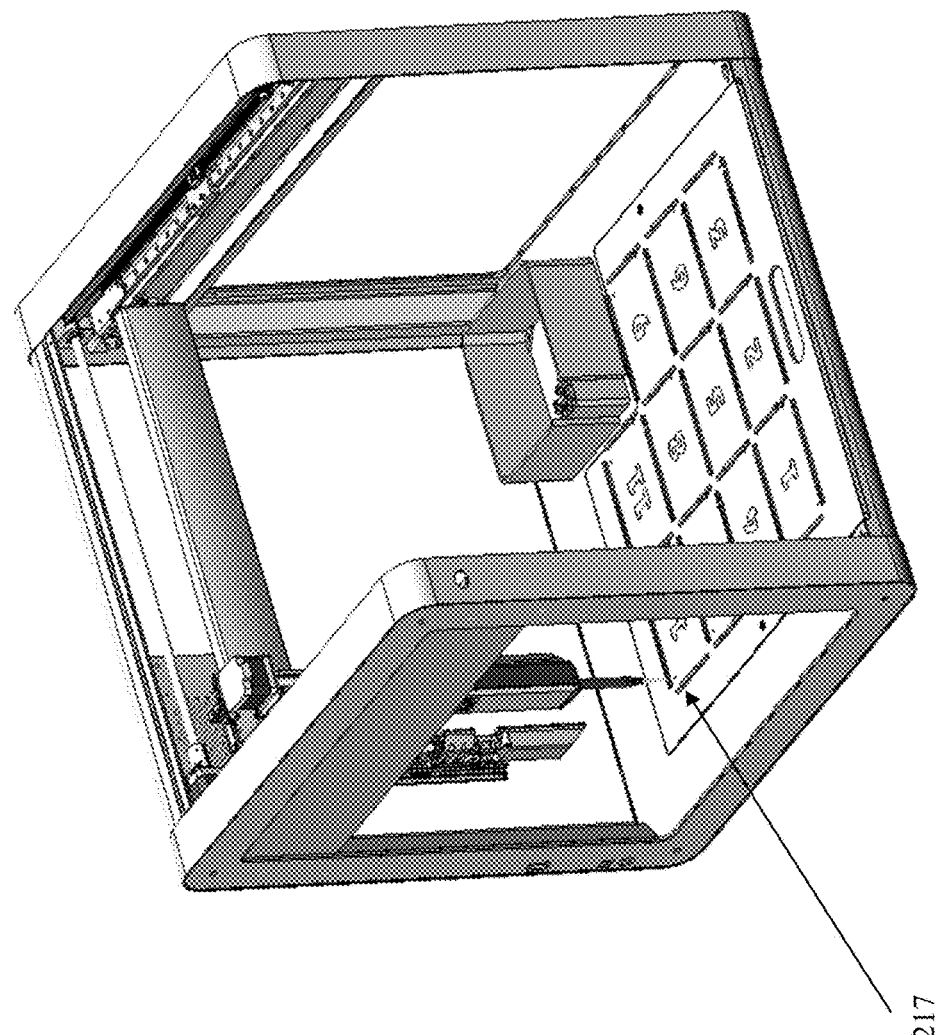
FIG. 4F shows operation 5 of the deck calibration process, according to various embodiments.

Further, at step 323 the pipette robot can travel the pipette tip to a point near calibration point 4 in terms of the X and Y directions (e.g., on order of within 1 cm from calibration point 4, in terms of the X and Y directions), and upward from calibration point 4 in terms of the Z direction (e.g., on order of 1 cm above calibration point 4 relative to the top surface of the deck). At step 325, the pipette can be jogged in the X, Y, and/or Z directions until the pipette tip is directly centered (or nearly directly centered) with calibration point 4. Then, at step 327 the pipette robot can save the X/Y/Z location of calibration point 4 on the deck, relative to the X, Y, and Z frame switches. Steps 323-327 can comprise operation 5 of the deck calibration process, and can be considered to generally regard an X/Y/Z calibration with respect to calibration point 4. Depicted in FIG. 4F is the pipette robot having completed operation 4. In FIG. 4F, calibration point 4 is shown as element 217.

Figure 4G:
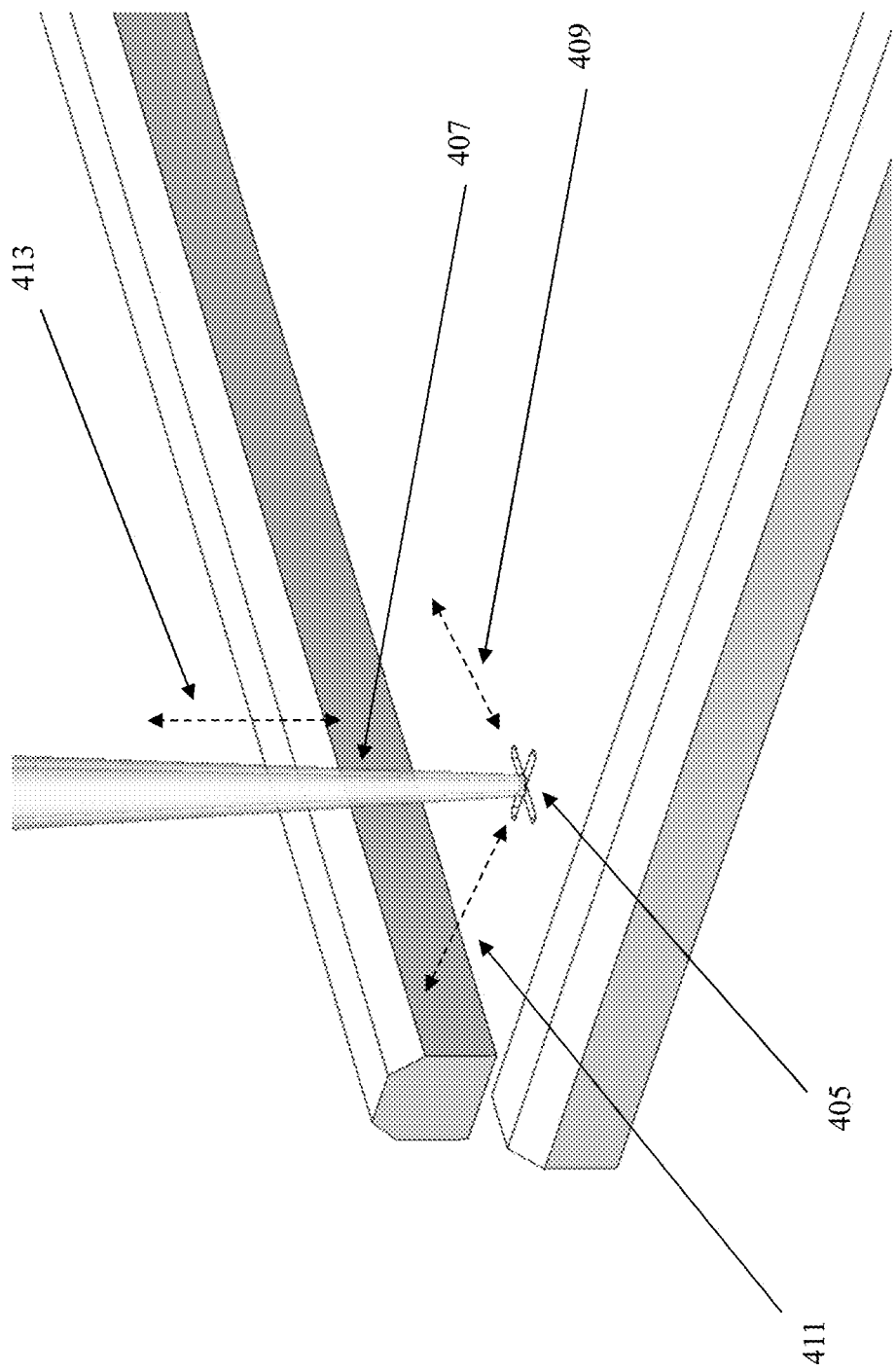
FIG. 4G shows an example cross mark, according to various embodiments.

It is noted that, in various embodiments, a cross (or other mark) can be situated at each of one or more of calibration points 1-4 on the deck. In these embodiments, in centering the pipette tip with a given one of calibration points 1-4 as discussed above, the pipette tip can be centered (or nearly centered) with the cross of the given calibration point. In FIG. 4G, such a cross mark is shown as element 405. Also shown in FIG. 4G are pipette tip 407, X-axis 409, Y-axis 411, and Z-axis 413.

Finally, at step 329 the pipette robot can calculate the rotation, shift, and tilt of the deck relative to the XYZ gantry.

For each of operations 2-5 of the deck calibration process, the pipette robot automatically travels the pipette tip to a fixed coordinate near each location discussed above in connection with FIG. 3. Subsequently, the pipette robot's jog controls 119 can be used to adjust the X, Y, and Z gantry motion such that the pipette robot positions the pipette tip at the intended position. In various embodiments, the pipette tip can be positioned at the intended position with approximately +/−0.35 mm, +/−0.1 mm, or better accuracy. The pipette robot is, in various embodiments, programmed at the factory to travel near each calibration point using a fixed coordinate relative to the home position. Generally, throughout the deck calibration process, a pipette is attached to the machine, and a pipette tip is pressed firmly onto the pipette.

After the completion of operations 1-5, the pipette robot knows: a) the mid-level plane of the deck; b) the XYZ coordinates of the three points at the extremes of the deck; and c) the relative location of the deck with respect to the frame switches.

The three XYZ points found in operations 3-5 can be used by the pipette robot to calculate the rotation, shift, and tilt of the fixed deck relative to the moving X, Y and Z axes of the gantry. In addition to this, when the pipette robot travels between calibration points 2 and 3, the pipette robot is able to calculate the scale that the gantry must travel about the X-axis in order to meet the scale of the deck in that axis. An analogous process can be performed by the pipette robot for the Y-axis between points 2 and 4. As such, the pipette robot is able to determine the scale of gantry movements relative to the deck in the X and Y axes. It is noted that, in various embodiments, the Z-axis for the pipette robot can be designed and/or be manufactured to be accurate enough for proper use without scaling.

With regard to various operations discussed hereinthroughout (e.g., with regard to scale and calibration), the following is noted. The pipette robot can instruct the motor of a given axis to rotate a specified number of rotational pulses to cause a given pipette robot component (e.g., the pipette assembly) to travel a certain linear distance on that axis. In some embodiments, a correlation between number of rotational pulses and distance moved can be based on observations and/or measurements made by the pipette robot. In other embodiments, the pipette robot can calculate such a correlation. In particular, the pipette robot can calculate such a correlation based, for example, on motor properties, and/or on the dimensions of the pulley and belt system connected to that motor. Such a correlation can be applicable to the particular pipette robot for which the correlation was determined, and also to a different unit of the pipette robot, assuming sufficient accuracies in manufacture.

However, component tolerances and assembly variations can result in the correlation determined for one unit of the pipette robot being not directly applicable to another unit of the pipette robot. As examples, such component tolerances and assembly variations can result in differences in: a) pulley diameter and/or pitch; b) belt length, tension, and/or pitch; and c) a non-parallel travel axis relative to deck assembly, to name just a few. Further, such differences can arise not only due to manufacturing issues, but alternatively or additionally during shipping of a pipette robot to a customer (e.g., such a difference might be initially caused by the original part manufacturer or assembler, and later amplified during shipping). Due to these variations, were one unit of the pipette robot to directly apply a pulses to linear distance correlation which was determined for another unit of the pipette robot, the linear movement which resulted from a given number of pulses might be less than or greater than what was intended, according to the correlation. Therefore, various operations discussed herein (e.g., the deck calibration process) can include the pipette robot calculating a scale. The scale acts as an adjustment multiplier which can be, based on the embodiment, applied to either the pulse side or the distance side of a correlation determined for another instance of the pipette robot. As an illustration, suppose that a correlation indicated that p pulses would cause d mm of movement. Here, a scale s can be determined by a particular pipette robot. The scale s can be used by the particular pipette robot such that the pipette robot would consider the correlation to be s·p pulses for d mm of movement when instructing the motor of a given axis.

In some embodiments, the deck can be produced from a single block of CNC'd aluminum (i.e., aluminum produced by a Computer Numerical Control Machine). In these embodiments, the distance between points 2 and 3 can be assumed by the pipette robot to be accurate within certain small tolerances (e.g., <+/−0.1 mm). Throughout the deck calibration process, as a particular pipette robot travels the gantry between points 2 and 3, the particular pipette robot can record the number of rotational motor pulses required to travel between these two points. The particular pipette robot can then divide the known distance between the points on the deck by the number of motor pulses in order to calculate the scale of the output distance to input pulses for the particular pipette robot. This same process can be repeated for the Y-axis between points 3 and 4.

The functionality by which the pipette robot can jog the X, Y, and Z axes to each point can be implemented in a number of ways. For example, an electronic device with an indicator (e.g., a sound or light indicator) can be attached to the portion of the pipette where a pipette tip generally fits. This device can contact the calibration points on the deck of the pipette robot. The pipette robot can then travel the electronic device to each point described above, and upon contact with each calibration point the electronic device can provide an indication of contact to the pipette robot. As such, the indication can aid the pipette robot in accurately positioning the pipette tip at the designated points. The functionality by which the electronic device recognizes contact with the calibration points can be implemented in a number of ways. For example, the electronic device can use one or more simple, inexpensive, and/or consumer-grade mechanical and/or optical switches. As another example, the electronic device can use one or more sensory devices used in CNC machines or Coordinate Measuring Machines (CMMs) machines.

In embodiments where the gantry moves along a perfect (or near perfect) plane and the deck is a perfectly flat (or nearly perfect flat) surface, the three XYZ points found in operations 3-5 can be sufficient for the pipette robot to determine the tilt of the deck. Typically, however, the gantry will not move along a perfect plane, and/or the deck will not be a perfectly flat surface. For these circumstances, the Z-axis height found in calibration point 1 can provide additional information regarding the warp of the deck. The pipette robot can use a software algorithm to provide non-planar motions of the Z-axis about the X and Y axes to more perfectly align the gantry with labware or other items positioned throughout the deck. Moreover, in various embodiments additional points can be added throughout the deck. By measuring these additional points, the pipette robot can potentially map out the Z-axis heights across the deck relative to the gantry with greater accuracy. Accordingly, improved accuracy during liquid handling motions throughout the full motion of the machine can be realized.

It is noted that the calibration point locations described herein are employed for illustrative purposes, and that different calibration point locations can be used. As such, the calibration points can be moved to other areas across the deck so long as the hardware and software are synchronized on the new locations of the points, and the distances between the points provide sufficient detail for accurate rotation, shift, tilt, and scale determination by the pipette robot. Likewise, the cross-like shape of the calibration points set forth herein is for illustrative purposes only, and differently-shaped calibration points can be used. For example, recession and/or protrusion features can be added to the deck for sensors to contact and use as calibration points. Additionally, in various embodiments the calibration points can be existing deck features (e.g., recessions and/or protrusions) rather than features explicitly added for use as calibration points. Further still, in various embodiments differing quantities of calibration points can be used.

In various embodiments, the deck and its corresponding calibration points can be produced from a material that is rigid, stable, and not prone to deformation due to environmental changes, such as heat and humidity. Accordingly, for instance, aluminum, such as a single piece of CNC aluminum, can be used. Where CNC aluminum is used, the calibration points located throughout the deck can be taken to have positional tolerances that are standard for CNC equipment (e.g., approximately +/−0.1 mm). The CNC deck slots in which labware sits can likewise be taken to have positional tolerances that are standard for CNC equipment. For embodiments where the deck and its corresponding calibration points are produced from a single piece of CNC aluminum, the noted tolerances can be considered accurate enough to allow the X, Y, and Z calibration described above to be performed without a need to calibrate the deck itself beforehand.

Various advantages are yielded via the deck calibration pipette robot functionality set forth herein. For example, during the setup of conventional liquid handler machines, it is common for: a) a technician to install and calibrate the machine manually using expensive fixtures and alignment equipment; or b) for high precision sensors to be installed on the pipette or travelling gantry itself in order to determine the displacement between the moving gantry and the frame. It is noted that such sensors can cost multiple orders of magnitude more than the equipment used for the calibration process discussed herein. Moreover, the pipette robot discussed herein can use inexpensive open loop stepper motors and drivers. In contrast, according to conventional approaches relatively expensive closed loop motors and drivers, that are able to inform the pipette robot of distances traveled in each axis, are typically used.

Described herein is an affordable pipette robot which can be set up upon receipt without the need for a specialist or technician to support the calibration process during initial machine setup. This simple calibration process also allows the pipette robot to be transportable. In contrast, according to conventional implementations, a pipette robot must remain fixed in one location, or a specialist or technician must return to re-perform calibration of the machine subsequent to its transport.

Pipette Tip/Probe Calibration

Figure 5A:
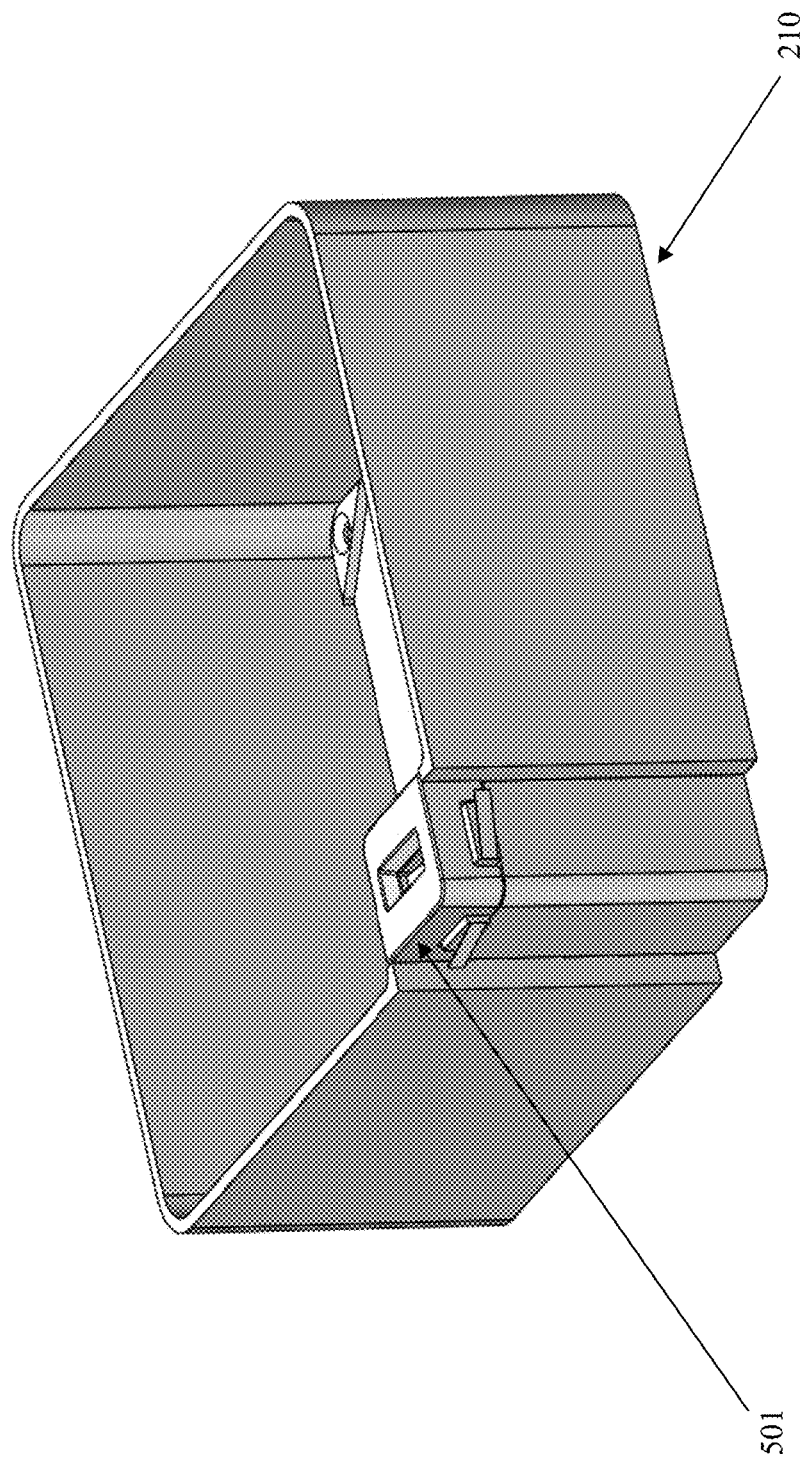
FIG. 5A shows a zoomed-in calibration assembly view, according to various embodiments.
Figure 5B:
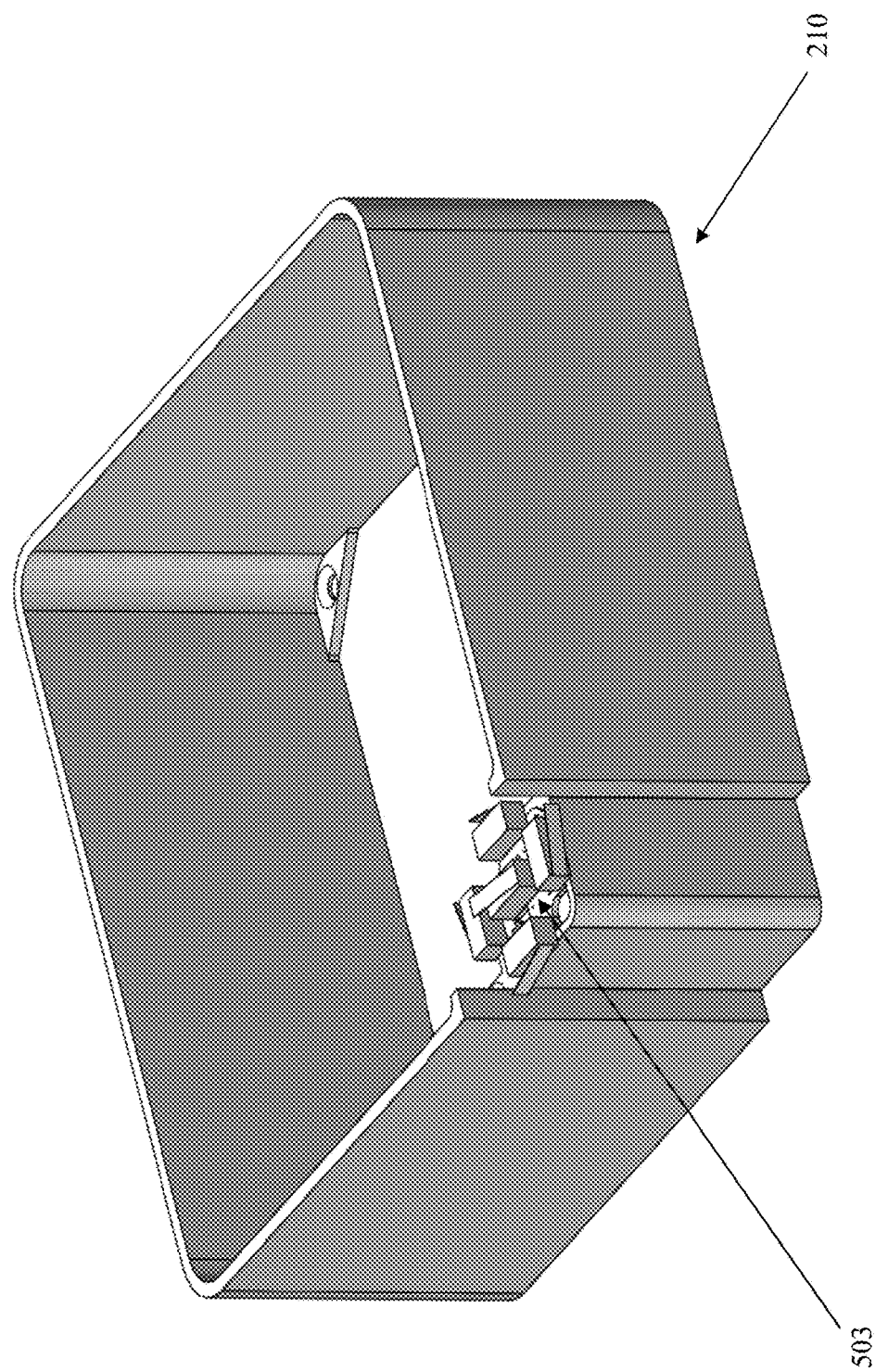
FIG. 5B shows a more-expressly zoomed-in calibration assembly view, according to various embodiments.
Figure 5C:
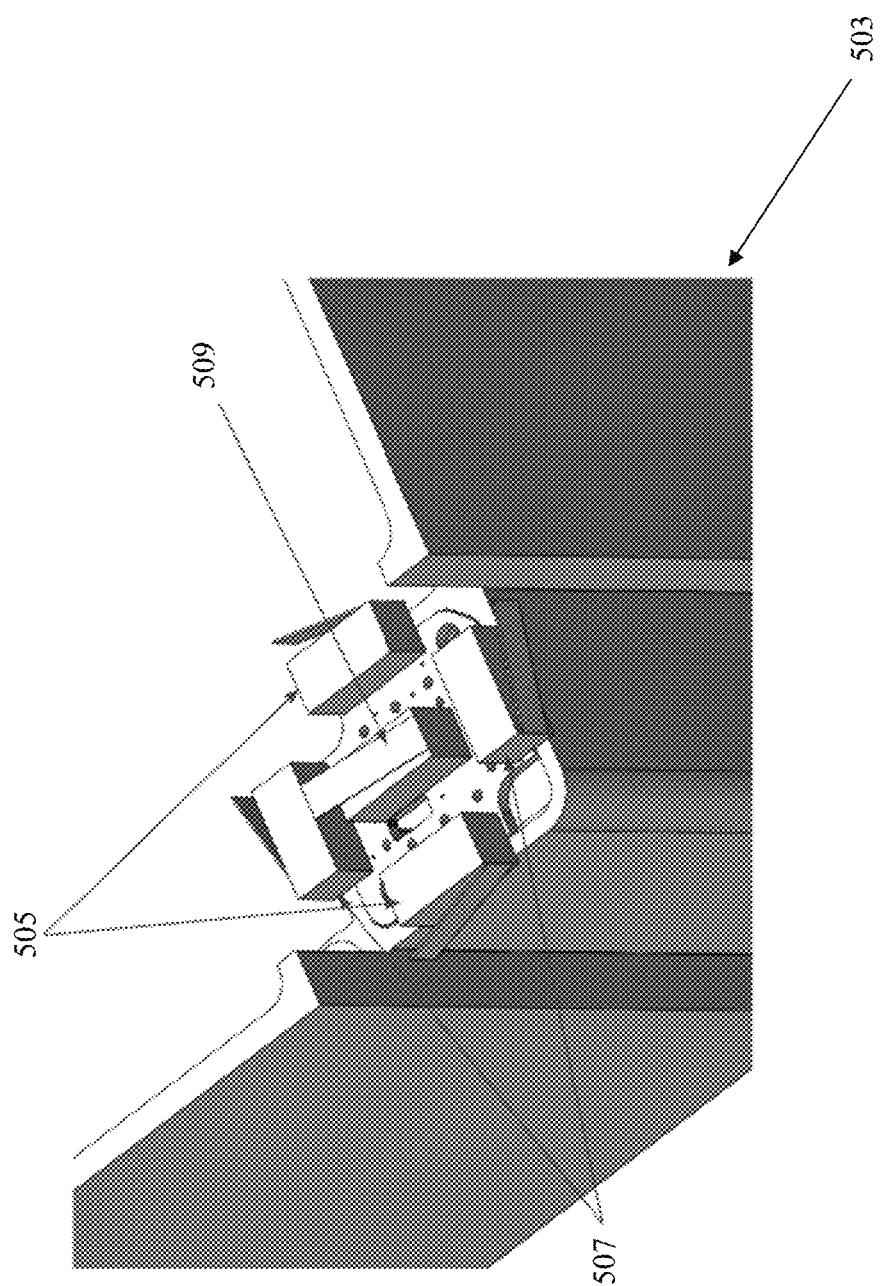
FIG. 5C shows a zoomed-in tip/probe switches view, according to various embodiments.
Figure 6:
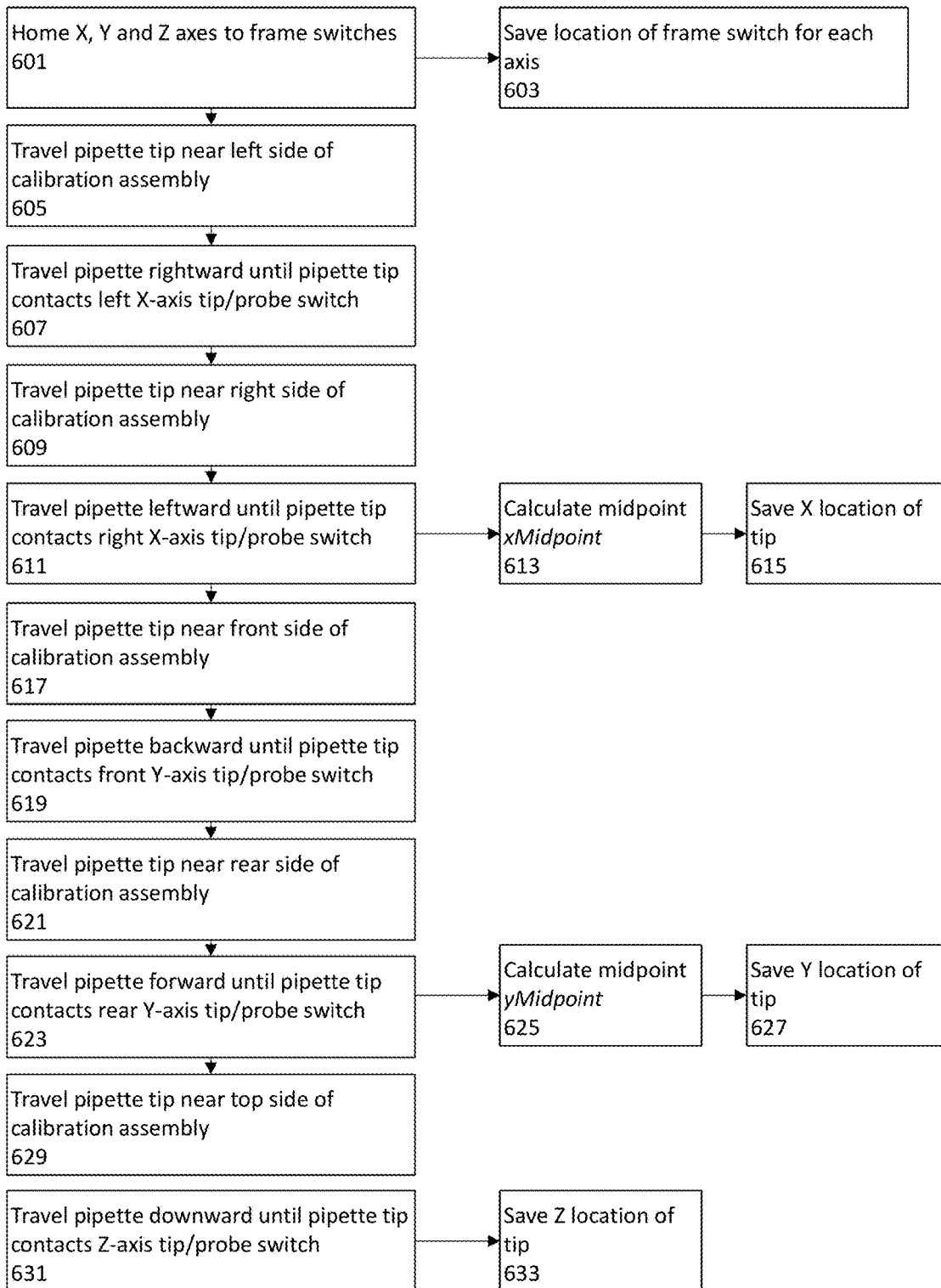
FIG. 6 shows a general tip/probe calibration procedure, according to various embodiments.

In various embodiments, the pipette robot can include a set of fixed tip/probe switches on the robot deck, actuated in X, Y, and Z directions. In various embodiments, these tip/probe switches can be situated within a calibration assembly, and the calibration assembly can be situated on the deck. The tip/probe switches can be implemented using limit switches. Returning to FIG. 2A, such a calibration assembly is shown as element 210. Then, FIG. 5A shows a zoomed-in view of the calibration assembly, including a cosmetic cover 501 of the calibration assembly. Shown in FIG. 5B is a more-expressly zoomed-in view of the calibration assembly, wherein the cosmetic cover has been removed, exposing the X, Y, and Z tip/probe switches 503. Then, FIG. 5C shows a zoomed-in view of the tip/probe switches. In particular, shown in FIG. 5C are an X-axis tip/probe switch pair 505, a Y-axis tip/probe switch pair 507, and a Z-axis tip/probe switch 509. To facilitate discussion, tip/probe calibration will be generally discussed in terms of a pipette which has a tip mounted to the probe portion of the pipette. However, it is to be understood that, in various embodiments, the tip/probe calibration can be performed using a pipette with no tip attached thereto. In these embodiments, various actions discussed below, such as the touching of a tip/probe switch by a tip, would instead involve the pipette probe—sans tip—touching the switch.

Performance of a general tip/probe calibration procedure can include the pipette robot moving a pipette with an attached tip until it activates each tip/probe switch. Two X and two Y tip/probe switches can be used to locate the pipette tip in the X-axis and Y-axis directions respectively, and one Z tip/probe switch can be used to locate the pipette tip in the Z-axis direction. With reference to FIGS. 2A, 2B, and 2C, either prior to or after the just-noted activation of the tip/probe switches, the XYZ gantry can home each axis with separate X (201), Y (203), and Z (205) frame switches. As discussed in greater detail below, distance values arising from the homing operation can be used to normalize/tare distance values arising from the noted tip/probe switch activations. Subsequently, these normalized/tared offset distance values can be saved, and later used by the pipette robot to determine the location of the pipette tip relative to the rest of the machine.

Turning now to FIGS. 6 and 7A-7F, discussed in greater detail is the performance of the general tip/probe calibration procedure by the pipette robot, according to various embodiments. The process of FIG. 6 will be discussed with respect to a scenario in which a pipette has been attached to the gantry of the pipette robot, and where a tip has been attached to the pipette. However, as referenced earlier, in various embodiments the process of FIG. 6 can be performed using a pipette which has no tip attached to its probe.

Figure 7A:
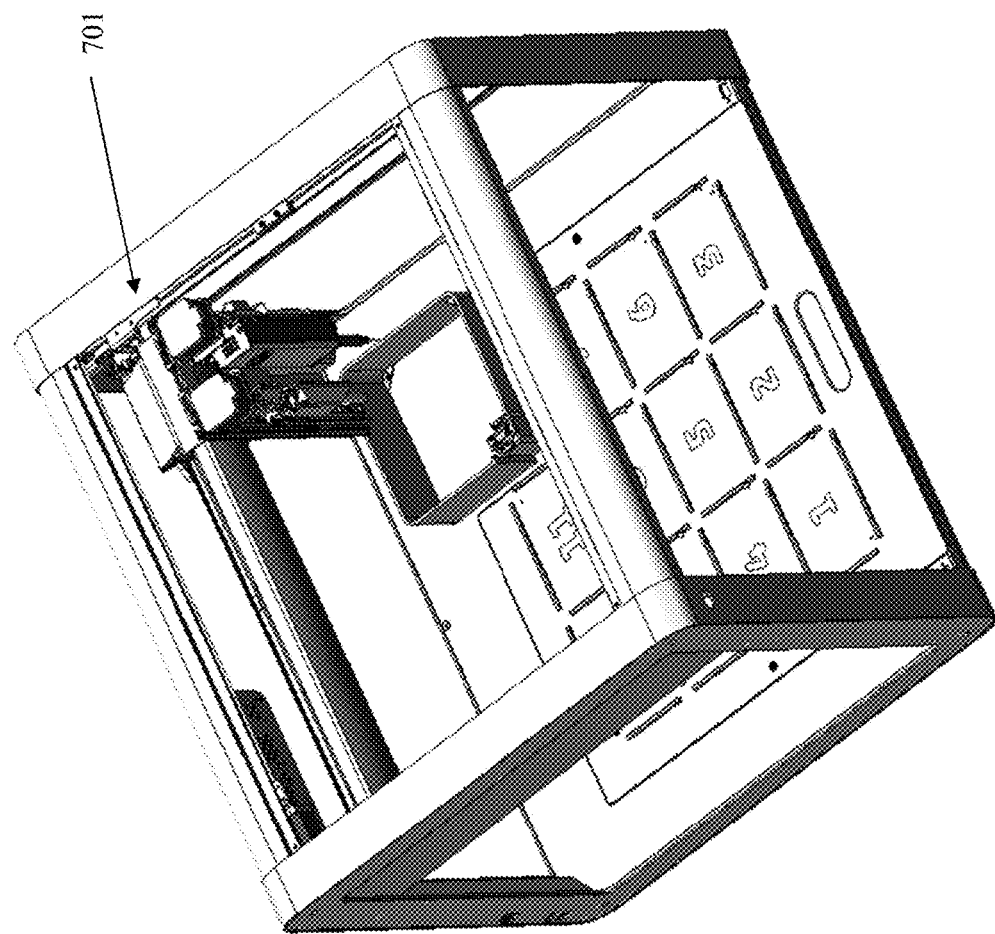
FIG. 7A shows operation 1 of the general tip/probe calibration procedure, according to various embodiments.

At step 601, the pipette robot can home each of the X, Y, and Z axes a to corresponding frame switch. At step 603, the pipette robot can save, for each of the three axes, the location of the frame switch for that axis. Steps 601 and 603 can comprise operation 1 of the general tip/probe calibration procedure, and can be considered to generally regard a homing of the X, Y, and Z axes. Depicted in FIG. 7A is the pipette robot having homed the X, Y, and Z axes (701) via operation 1.

Figure 7B:
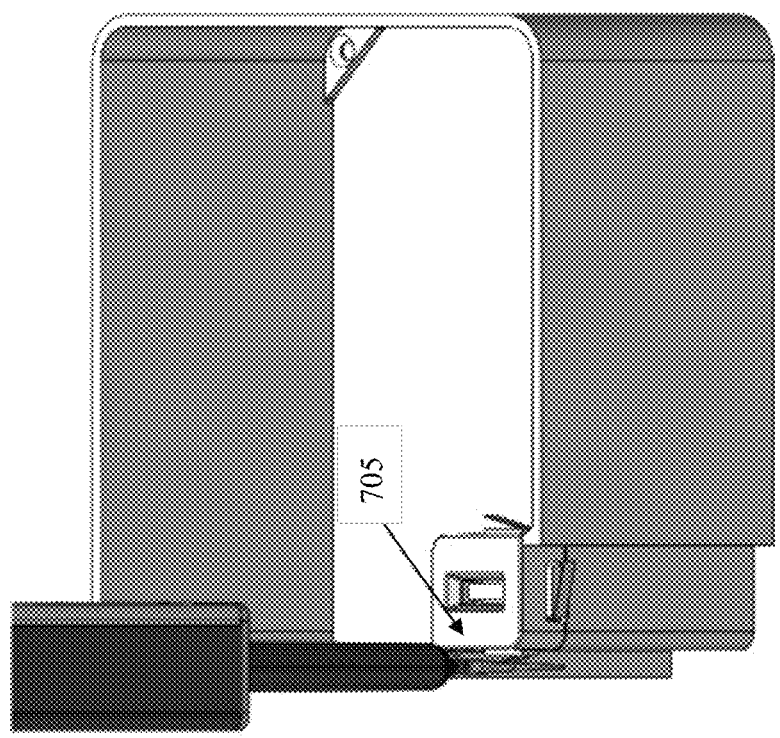
FIG. 7B shows operation 2A of the general tip/probe calibration procedure, according to various embodiments.
Figure 7B:
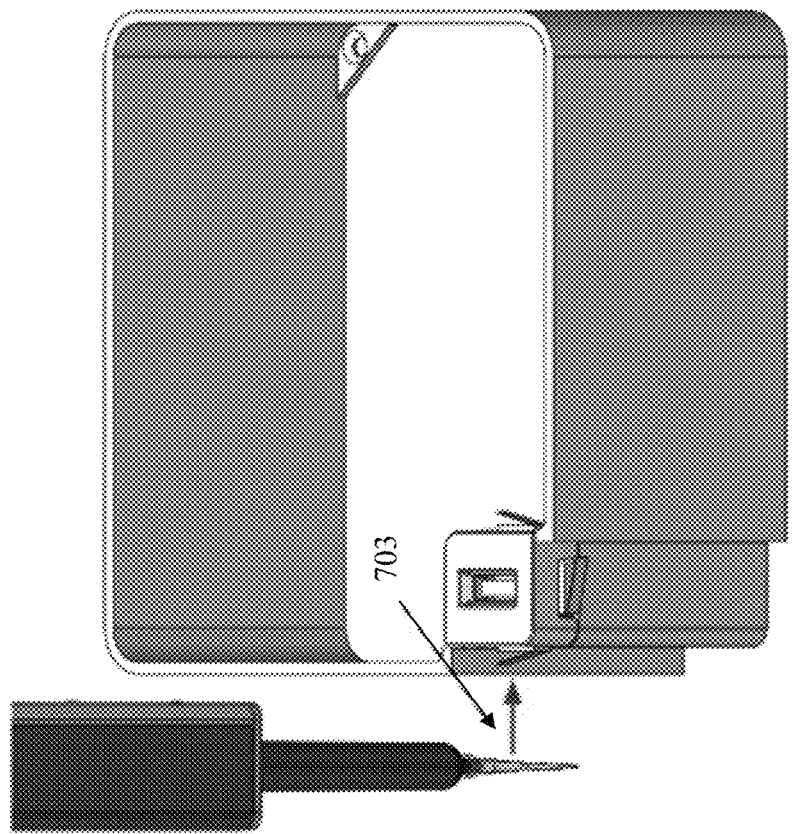

At step 605, the pipette robot can travel the pipette tip to near the left side of the calibration assembly. Then at step 607 the pipette robot can travel the pipette rightward until the pipette tip contacts the left X-axis tip/probe switch. The pipette robot can store this location as xAxisLeft. Steps 605 and 607 can comprise operation 2A of the general tip/probe calibration procedure, and can be considered to generally regard X-axis left switch activation. Depicted in FIG. 7B are the discussed actions of operation 2A. In particular, element 703 depicts the noted traveling if the pipette tip of step 605, while element 705 depicts the noted contact of step 607.

Next, at step 609 the pipette robot can travel the pipette tip to near the right side of the calibration assembly. Then at step 611 the pipette robot can travel the pipette leftward until the pipette tip contacts the right X-axis tip/probe switch. The pipette robot can store this location as xAxisRight. Then, at step 613 the pipette robot can calculate the midpoint xMidpoint between the noted saved xAxisLeft and xAxisRight. In particular, the pipette robot can calculate the midpoint as:

$$xMidpoint = \frac{xAxisRight - xAxisLeft}{2} + xAxisLeft$$

The pipette robot can normalize/tare xMidpoint with respect to the location of the X-axis frame switch which was saved at step 603. In this way the pipette robot can ascertain the X location of the tip, relative to the frame. In various embodiments, the taring can include determining the distance between the location xMidpoint and the location of the X-axis frame switch which was saved at step 603.

Figure 7C:
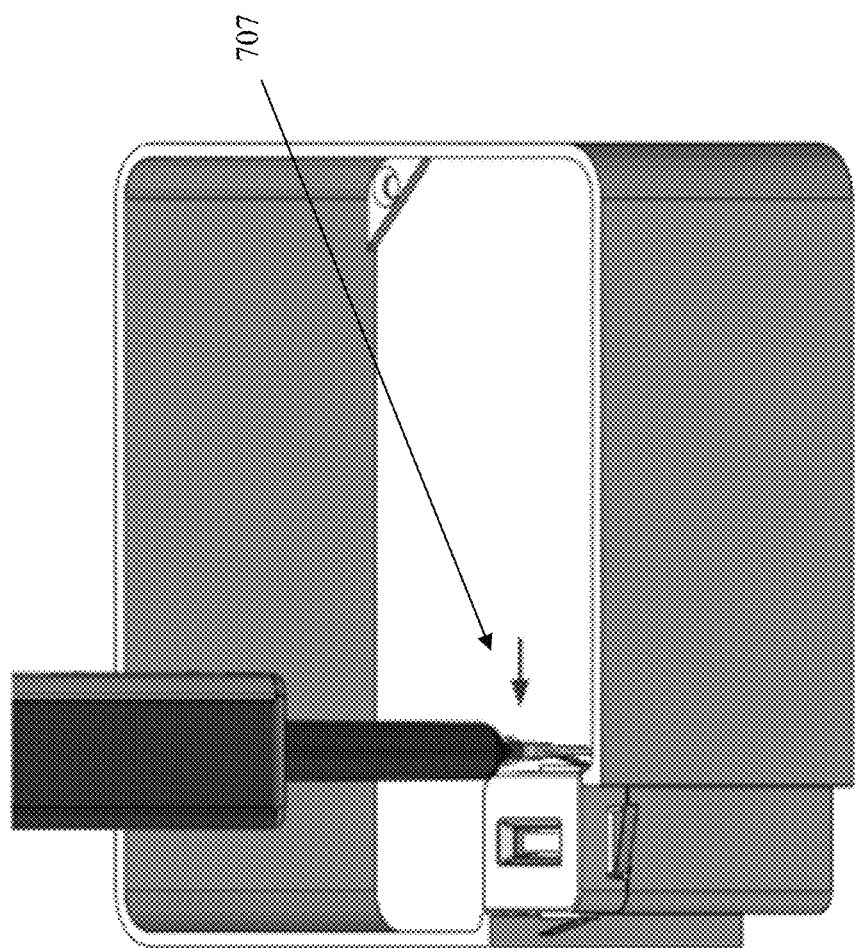
FIG. 7C shows operation 2B of the general tip/probe calibration procedure, according to various embodiments.

Then, at step 615 the pipette robot can save this X location of the tip, relative to the frame. Steps 609-615 can comprise operation 2B of the general tip/probe calibration procedure, and can be considered to generally regard X-axis right switch activation, and tip X-axis location determination. Depicted in FIG. 7C is the discussed action of operation 2B. In particular, element 707 depicts the noted contact of step 611.

Figure 7D:
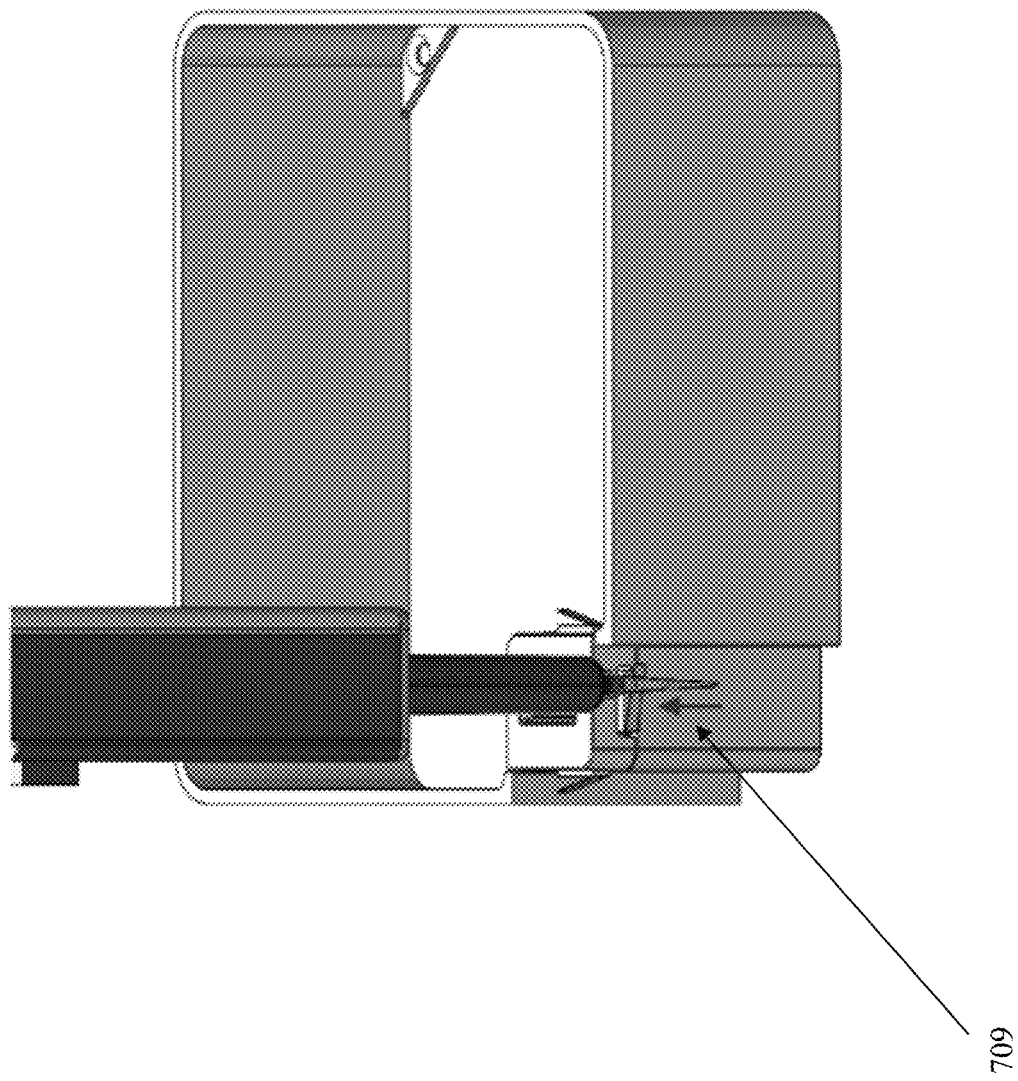
FIG. 7D shows operation 3A of the general tip/probe calibration procedure, according to various embodiments.

At step 617, the pipette robot can travel the pipette tip to near the front side of the calibration assembly. Then at step 619 the pipette robot can travel the pipette backward until the pipette tip contacts the front Y-axis tip/probe switch. The pipette robot can store this location as yAxisFront. Steps 617 and 619 can comprise operation 3A of the general tip/probe calibration procedure, and can be considered to generally regard Y-axis front switch activation. Depicted in FIG. 7D is the discussed action of operation 3A. In particular, element 709 depicts the noted contact of step 619.

Next, at step 621 the pipette robot can travel the pipette tip to near the rear side of the calibration assembly. Then at step 623 the pipette robot can travel the pipette forward until the pipette tip contacts the rear Y-axis tip/probe switch. The pipette robot can store this location as yAxisRear. Then, at step 625 the pipette robot can calculate the midpoint yMidpoint between the noted saved yAxisFront and yAxisRear. In particular, the pipette robot can calculate the midpoint as:

$$yMidpoint = \frac{yAxisRear - yAxisFront}{2} + yAxisFront$$

The pipette robot can normalize/tare yMidpoint with respect to the location of the Y-axis frame switch which saved at step 603. In this way the pipette robot can ascertain the Y location of the tip, relative to the frame. In various embodiments, the taring can include determining the distance between the location yMidpoint and the location of the Y-axis frame switch which was saved at step 603.

Figure 7E:
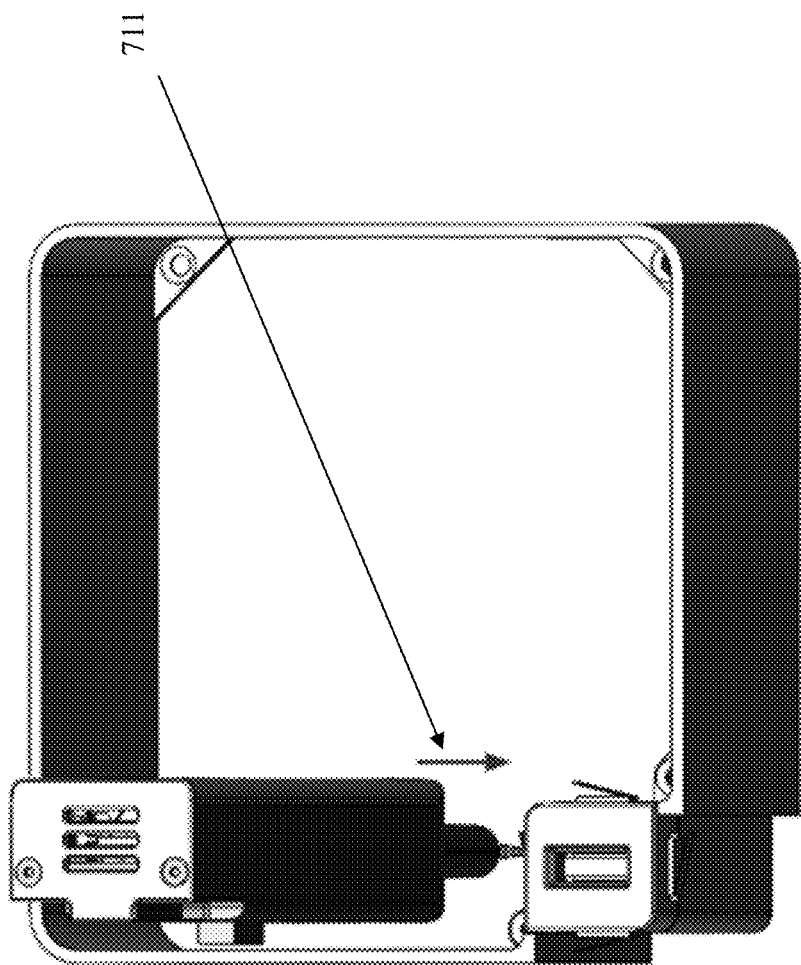
FIG. 7E shows operation 3B of the general tip/probe calibration procedure, according to various embodiments.

Then, at step 627 the pipette robot can save this Y location of the tip, relative to the frame. Steps 621-627 can comprise operation 3B of the general tip/probe calibration procedure, and can be considered to generally regard Y-axis rear switch activation, and tip Y-axis location determination. Depicted in FIG. 7E is the discussed action of operation 3B. In particular, element 711 depicts the noted contact of step 623.

Further, at step 629 the pipette robot can travel the pipette tip to near the top side of the calibration assembly. Then at step 631 the pipette robot can travel the pipette downward until the pipette tip contacts the Z-axis tip/probe switch. The pipette robot can store this location as zAxis.

The pipette robot can normalize/tare zAxis with respect to the location of the Z-axis frame switch which was saved at step 603. In this way, the pipette robot can ascertain the Y location of the tip, relative to the frame. In various embodiments, the taring can include determining the distance between the location zMidpoint and the location of the Z-axis frame switch which was saved at step 603.

Figure 7F:
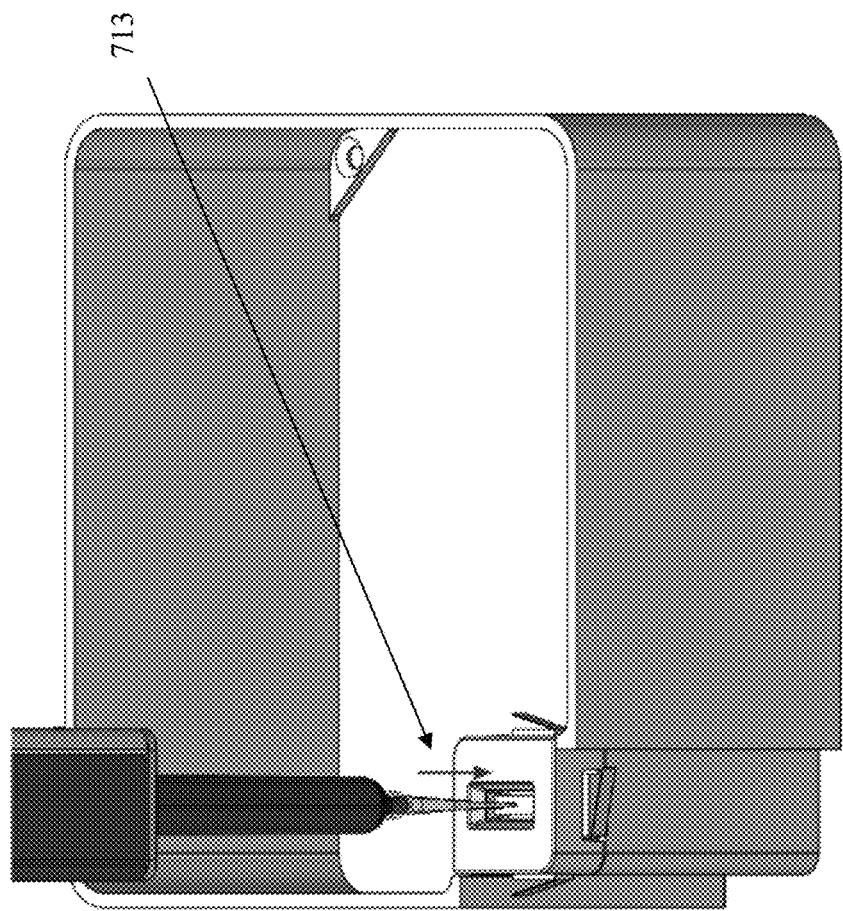
FIG. 7F shows operation 4 of the general tip/probe calibration procedure, according to various embodiments.

Then, at step 633 the pipette robot can save this Z location of the tip, relative to the frame. Steps 629-633 can comprise operation 4 of the general tip/probe calibration procedure, and can be considered to generally regard Z-axis switch activation, and tip Z-axis location determination. Depicted in FIG. 7F is the discussed action of operation 4. In particular, element 713 depicts the noted contact of step 631.

Subsequently, the values which were saved at steps 615, 627, and 633 can be used by the pipette robot pipette robot to perform fluid handling operations which increased accuracy.

Figure 8:
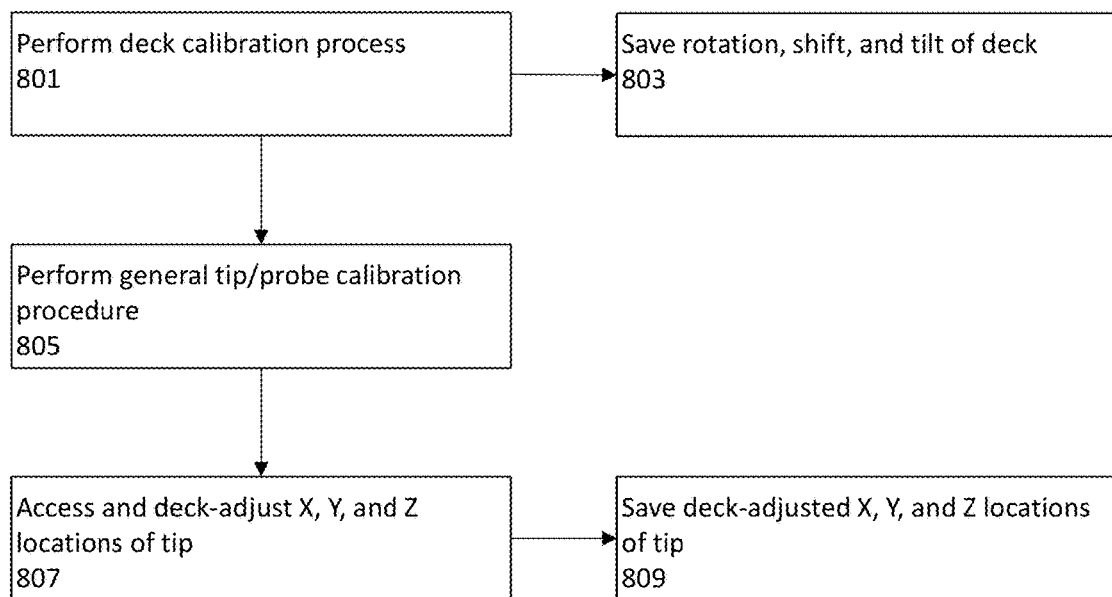
FIG. 8 shows an inaugural run/factory calibration procedure, according to various embodiments.

According to various embodiments, an inaugural run/factory calibration procedure can be performed by the pipette robot. As just one example, this procedure can be performed at the time the pipette robot is manufactured. The procedure can include performance of the above-discussed deck calibration process, and can further include performance of the above-discussed general tip/probe calibration procedure. In various embodiments, the pipette robot can perform the inaugural run/factory calibration procedure with a pipette attached to the gantry of the pipette robot, and where a tip has been attached to the pipette. The inaugural run/factory calibration procedure will now be discussed in greater detail with reference to FIG. 8.

At step 801, the pipette robot can perform the above-discussed deck calibration process. Then at step 803 the pipette robot can save the rotation, shift, and tilt of the deck relative to the XYZ gantry which, as discussed above, are calculated by the pipette robot as part of the deck calibration process. At step 805, the pipette robot can perform the above-discussed general tip/probe calibration procedure. Then, at step 807 the pipette robot can access the normalize/tared relative-to-frame X, Y, and Z locations of the tip which are determined via the general tip/probe calibration procedure. Further at step 807, the pipette robot can adjust these values in view of the rotation, shift, and tilt of the deck as determined via step 801. Then, at step 809 the pipette robot can save the adjusted values generated via step 807.

Figure 9:
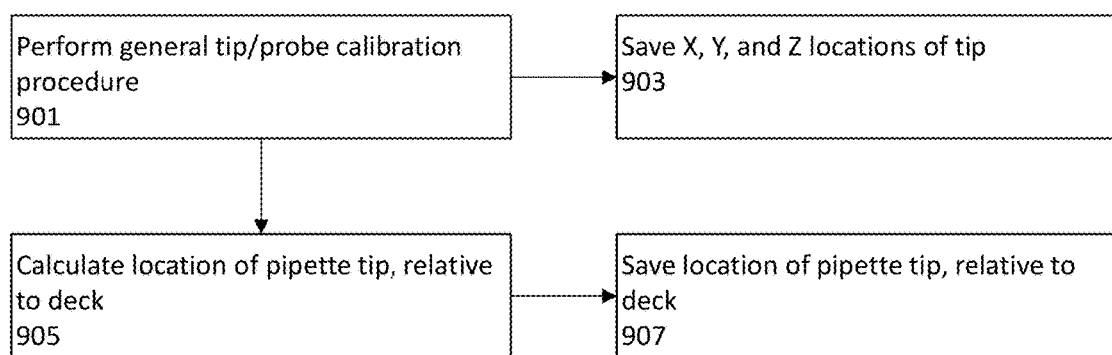
FIG. 9 shows a user premises calibration procedure, according to various embodiments.

Moreover, in various embodiments a user premises calibration procedure can be performed by the pipette robot. As just one example, this procedure can be performed at a laboratory or business where the pipette robot is to be used. The procedure can include performance of the above-discussed general tip/probe calibration procedure. In various embodiments the pipette robot can perform the user premises calibration procedure with a pipette attached to the gantry of the pipette robot, and where a tip has been attached to the pipette. The user premises calibration procedure will now be discussed in greater detail with reference to FIG. 9.

At step 901, the pipette robot can perform the above-discussed general tip/probe calibration procedure. At step 903, the pipette robot can save the normalized/tared relative-to-frame X, Y, and Z locations of the tip which are determined via the general tip/probe calibration procedure of step 901. Next, at step 905 the pipette robot can use: 1) the normalized/tared relative-to-frame X, Y, and Z locations of the tip which were saved at step 903; and 2) the values which were saved at step 809 of the inaugural run/factory calibration procedure to calculate the location of the currently-attached pipette tip, relative to the deck.

Then, at step 907 the pipette robot can save this relative-to-deck location value for the currently-attached tip. Subsequently, the value saved at step 907 can be used by the pipette robot to perform fluid handling operations which increased accuracy.

According to various embodiments, a same pipette tip can be utilized for both the inaugural run/factory calibration procedure and the user premises calibration procedure. In these embodiments, the functionality of step 905 can include determining a delta between the value saved at step 809 of the inaugural run/factory calibration procedure and the value saved at step 903 of the user premises calibration procedure. In particular, because the same tip was used for both procedures, the delta can be considered to reflect the impact of the deck oriented adjustment of step 807. As such by in the calculation of step 905 applying this delta to the value saved at step 903, the value saved at step 903 can be altered so as to reflect the impact of the deck without having to perform the above-discussed deck calibration process (e.g., allowing a laboratory or business using the system to avoid performing the deck calibration process on premises). Moreover, in various embodiments the delta can be saved. Subsequently, the above-discussed general tip/probe calibration procedure can be performed, such as with a different tip. Then, by applying the saved delta to the X, Y, and Z tip location results of the further general tip/probe calibration procedure, such results can be made to reflect the impact of the deck, while again avoiding a need to reperform the deck calibration process.

Through the use of the above operations, the pipette robot can determine, with sub-millimeter accuracy, the location of any pipette and corresponding pipette tip that has been attached to the machine. As referenced, the general tip/probe calibration procedure initially provides relative location information between the interchangeable pipette with its attached pipette tip, and the calibration assembly. Where the calibration assembly is fixed to the frame, the calibration assembly and robot frame can be a fixed known distance from each other (e.g., with the pipette robot coming to know the distance via the operations of step 601). As such, the relative location initially yielded by the general tip/probe calibration procedure can be normalized/tared using this distance, as discussed. Also, the above-described inaugural run/factory calibration procedure and user premises calibration procedure can be used in determining a relative-to-deck location value for the attached pipette tip.

Through the use of the Z-axis tip/probe switch, the pipette robot can, as examples, not only determine the location of any pipette tip that was used during the calibration process, but can also determine the heights at which different brands or models of tips sit on the pipette, including tips with varying lengths.

The calibration assembly depicted in, for instance, FIGS. 5A and 5B can be composed of a material which exhibits a stiffness such that, during the general tip/probe calibration procedure, the calibration assembly deflects by an order of magnitude less than any deflection of the pipette assembly. In various embodiments, the calibration assembly can be composed of a single aluminum housing. Moreover, in various embodiments a rigid PCB can be bolted securely to the calibration assembly. By having the calibration assembly exhibit such stiffness, inaccuracy during the general tip/probe calibration procedure can be avoided. In particular, the calibration assembly does not necessarily deflect in a symmetric manner during the general tip/probe calibration procedure. Accordingly, were the calibration assembly to not exhibit the discussed stiffness, upon contact with the left and right X-axis tip/probe switches the calibration assembly could deflect a noticeable amount further to the left or to the right. As such, various inaccurate results could be generated from the general tip/probe calibration procedure. For example, the general tip/probe calibration procedure could provide a centerline result of the pipette that is not accurate due to the asymmetric deflection of the calibration assembly. An analogous situation holds for the Y-axis tip/probe switches.

In some embodiments, the pipette robot allows for the pipette tips, rather than the pipette itself, to contact the calibration assembly. Such can yield a number of benefits. For example, such can ensure that the pipette itself remains sterile, as only the disposable pipette tips are allowed to contact the mechanical switches. As another example, such can allow for the location of the attached tip—rather than merely the location of the pipette itself—to be accurately determined. The ability to accurately determine the location of the tip can be beneficial, as the tip is typically the part of the assembly that demands the highest degree of accuracy during robot use.

Also, in some embodiments, the discussed process can be used for either a single pipette, or for two separate pipettes attached to the moving gantry. If using two pipettes, the pipette robot can repeat the above process in order to find the location for the second attached pipette and corresponding pipette tip relative to the robot frame.

Further, in some embodiments, a first pair of switches can be used for the X-axis, and a second pair of switches can be used for the Y-axis. Such can provide a number of benefits. For example, such can allow for flex occurring in the pipette robot to be accounted for. For instance, when activating the leftward switch of the pair of X-axis switches, the force of the switch can cause the pipette to flex in the leftward direction. Considered in isolation, the leftward switch could yield a varying degree of accuracy of results due to the variation of stiffness in each pipette or pipette tip. However, by additionally activating the rightward switch of the pair of X-axis switches, the pipette can flex a comparable amount towards the right direction. Accordingly, by utilizing the outputs of both the leftward and rightward switches, the pipette robot is able to determine an accurate centerline between the two switches. An analogous circumstance holds for the switches of the Y-axis pair.

An additional benefit of using pairs of tip/probe switches is that the pipette robot can more accurately determine the centerline of pipette tips. For example, for the X-axis pair of tip/probe switches, while traveling the pipette tip rightward to the leftmost X-axis tip/probe switch, the rightmost outer radius of the tip contacts the leftmost tip/probe switch. However, such a contact provides the pipette robot with no knowledge about where the center of the tip is located, unless the pipette robot estimates the radius of the tip. But, this estimation can potentially be difficult to perform. For example, because each tip is conical, the radius of the tip varies along the Z-axis of the tip. Further, the pipette robot is compatible with tips of varying shapes and dimensions. As such, tip radius estimation would call for the pipette robot to be knowledgeable about the particular shapes and dimensions of these tips (e.g., the pipette robot might need to prompt users to provide this shape/dimension information). However, by using a pair of tip/probe switches in the X-axis, subsequent to having the rightmost outer radius of the tip contact the leftmost tip/probe switch as discussed, the pipette robot can travel the pipette tip such that the leftmost outer radius of the tip contacts the rightmost tip/probe switch. In particular, the pipette robot can perform this operation such that the leftward tip/probe switch and the rightward tip/probe switch each contact the tip at a similar Z-axis point on the tip. As such, both the leftward tip/probe switch and the rightward tip/probe switch can each contact the conical tip at a similar radius of the multiple, height-dependent radii exhibited by the tip. Accordingly, the pipette robot can determine the centerline point of the pipette tip, independent of the tip shape or radius and without any tip dimension estimations or foreknowledge being required. An analogous circumstance holds for the switches of the Y-axis pair.

Figure 10:
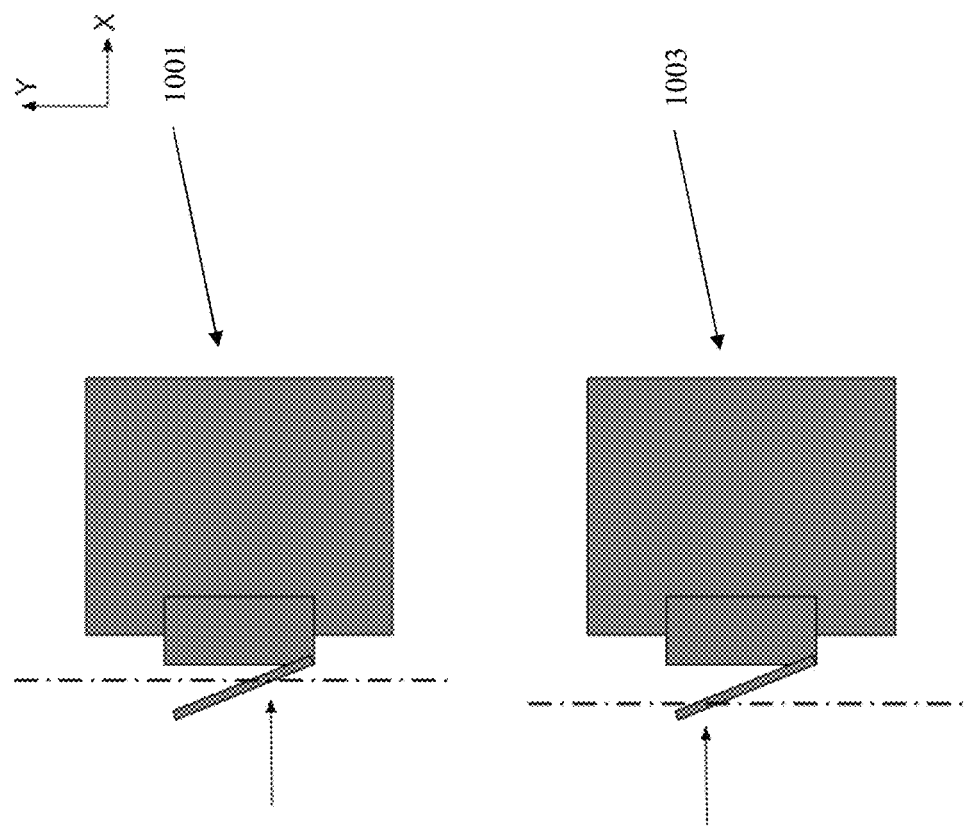
FIG. 10 shows two instances of one switch of an angled switch pair, depicted in isolation, according to various embodiments.
Figure 11:
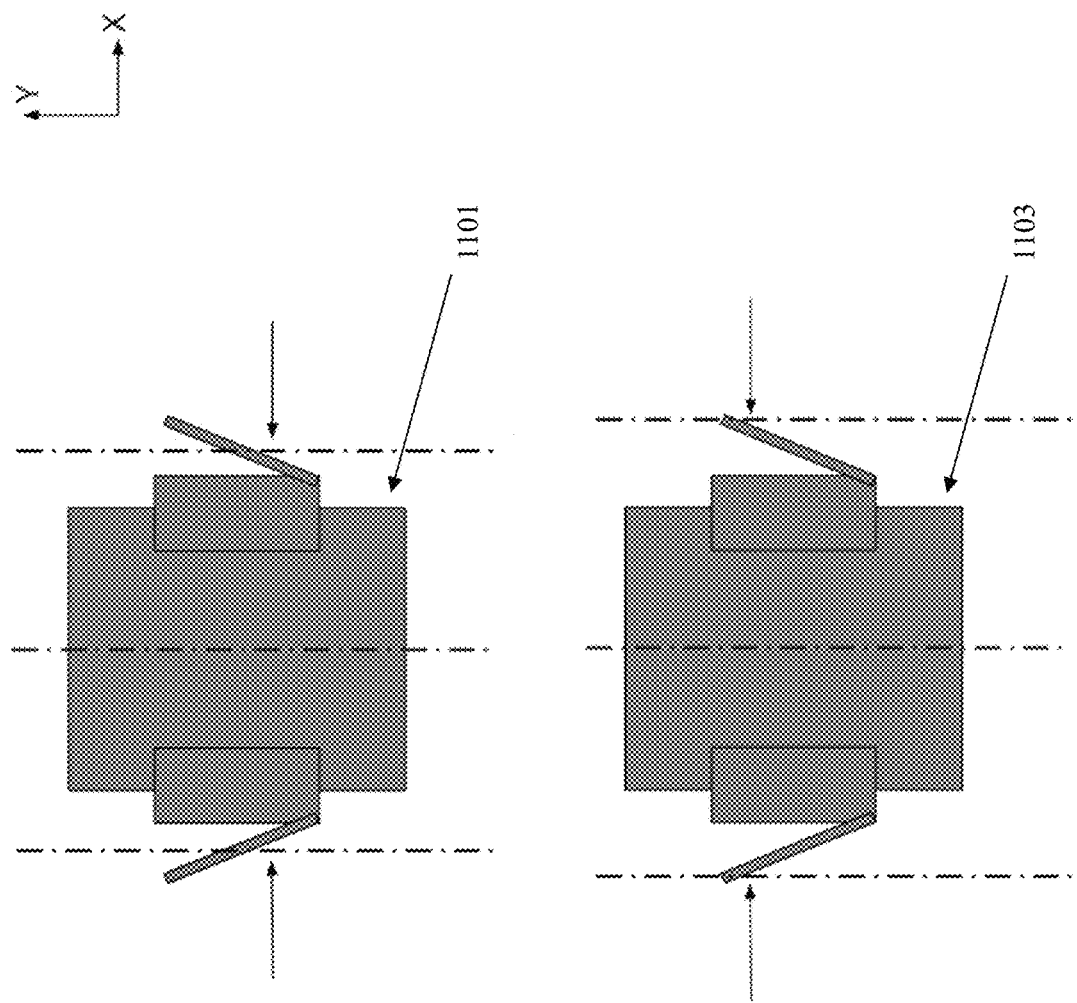
FIG. 11 shows two instances of complete angled switch pairs, according to various embodiments.

In some embodiments, as depicted in FIGS. 10 and 11, the pipette robot can utilize angled (e.g., non-vertical) switches. FIG. 10 includes angled switch 1001 and angled switch 1003. In particular, switch 1001 is one switch of a first angled switch pair, shown in isolation. Likewise, switch 1003 is one switch of a second angled switch pair, shown in isolation. Then, FIG. 11 shows complete angled switch pair 1101, and complete angled switch pair 1103.

In such embodiments, a further example benefit of utilizing switch pairs can be realized. This benefit will now be illustrated with regard to the pair of X-axis switches; an analogous situation holds for the pair of Y-axis switches. With reference to FIGS. 10 and 11, when considered in isolation a location about the Y-axis at which the pipette tip contacts a given X-axis switch of the pair can yield varying X-axis distance results. Variation in Y-axis activation causes variation in X-axis results. This is because the angled lever of an X-axis tip/probe switch can provide for a varying activation point depending on where the switch is touched along its Y-axis. Likewise, the angled lever of a Y-axis tip/probe switch provides for a varying activation point depending on where the switch is touched along its X-axis. However, by collecting reads from both switches of the X-axis or Y-axis pair, the pipette robot is able to accurately determine a centerline between the two switches of the pair. In particular, for the X-axis pair, throughout the calibration process the pipette robot can assume that the leftmost switch of the pair and the rightmost switch of the pair are touched at similar points along their respective Y-axes. As such, the pipette robot can consider the offset that is created, due to Y-axis variation, in the X-axis dimension for the leftmost switch to be symmetric and equivalent to the offset that is created in the X-axis dimension for the rightmost switch. In other words, by activating both the leftward and the rightward switch of the pair, the X-axis offset becomes balanced and therefore negligible. Variation in Y-axis activation does not affect X-axis centerline results. Furthermore, since the X-axis offset is symmetric, the centerline remains fixed about the approximate center of the two switches. An analogous circumstance holds for the Y-axis switches.

It is noted that, in some embodiments, during shipping or when replacing the pipette or pipette tip it can be assumed that the X and/or Y axis pipette tip location has translated (e.g., due to the pipette robot being jostled). On the other hand, as the calibration process does not take an undue amount of time to complete, in various embodiments the pipette robot can assume that no such undesired translation occurs during the calibration process. Furthermore, in various embodiments the pipette robot can assume that a single pipette and pipette tip are used during the calibration process.

The described functionality can work with a wide variety of switches. As examples, mechanical or optical tip/probe switches, as well as force sensitive, capacitive, or similar types of sensors can be used.

In some embodiments, where optical switches or alternative non-contact sensors are used, rather than using switch/sensor pairs, a single switch/sensor can be used for the X-axis, and a single switch/sensor can be used for the Y-axis. In particular, with the use of non-contact sensors there would be no deflection of the pipette or pipette tip. As such, there would be no call to compensate for deflection as discussed above.

Moreover, where optical sensors are used, finding the centerline of the pipette tip in a given axis can be accomplished using only a single optical sensor. For example, considering a single X-axis optical switch, the pipette robot can travel the tip in the right direction through the optical switch and record the initial entering location of the tip (e.g., the first instance of optical detection of the tip by the switch, or the tip entering the field of view of the switch), thereby providing the point of the rightmost outer diameter side of the tip. Subsequently, the pipette robot can continue traveling the tip in the right direction and record the exit location of the tip (e.g., the last instance of optical detection of the tip by the switch, or the tip exiting the field of view of the switch), thereby providing the point of the leftmost diameter side of the tip. The pipette robot can then perform a calculation involving subtracting the entering and exiting locations of the tip through the sensor in order to find the X-axis dimensions of the sensor activation/deactivation. Subsequently, the pipette robot can determine the mid-point between the entering and exiting locations of the tip in order to find the centerline of the tip. Similarly, the pipette robot can travel the tip in the right direction through the switch, and then travel the tip through the switch in the left direction. The pipette robot can then perform a calculation similar to the one just described by using solely the entering or exiting sensor activation or deactivations of each travel direction. Such a process can be employed, for example, in embodiments where activation/entering sensing is more precise than deactivation/exiting sensing. The same is true for vice-versa, or if for some reason the combination of the two was less precise than either one. An analogous circumstance holds for the switches of the Y-axis pair.

Also, in embodiments where optical switches are used, the Z-axis tip/probe switch can be eliminated. Instead, the X-axis or Y-axis optical switch can be used in order to find the Z-axis height of the tip. For example, the pipette robot can travel the pipette tip through the X-axis optical switch in the right direction, then back through the switch in the left direction, and continue to repeat this process while moving the Z-axis height of the pipette upwards by a selected amount (e.g., 0.1 mm) after each travel back and forth. At some point, the X-axis optical switch can no longer recognize an activation and deactivation between travels. Such a lack of recognition can be indicative of the pipette tip having ascended to a height above the X-axis switch. The pipette robot can consider such height to be the Z-axis height of the tip (e.g., the pipette robot can calculate the Z-axis height of the tip as the number of times the pipette robot had moved the pipette upwards, multiplied by the selected amount of each upward movement, for instance 0.1 mm). The Y-axis sensor can be used instead of the X-axis sensor in an analogous manner. Further, in some embodiments the pipette robot can, instead of detecting a pipette tip attached to the pipette, detect the pipette itself (e.g., detect a given spot on the pipette itself). In some embodiments where the pipette robot detects the pipette itself, optical switches or alternative non-contact sensors can be used rather than, say, mechanical switches (e.g., from the vantage point that such use of optical switches or alternative non-contact sensors can reduce the potential for contamination of the pipette).

In some embodiments, where a capacitive sensor is used, a metallic tip or a plastic tip with a metallic portion fixed inside or on the outside of the tip can be used instead of an entirely plastic tip for the calibration process. The use of such a tip can provide for sensing by a capacitive sensor that has difficulty sensing an entirely plastic tip. In some embodiments, the metallic or partially metallic tip can be designed to have a similar shape and/or flexibility to a plastic tip to be used outside of calibration. As such, the metallic or partially metallic tip can be used for calibration purposes and then removed and replaced with a standard plastic tip, with the calibration data obtained using the metallic or partially metallic tip being applicable to operation using the standard plastic tip. The capacitive sensor would not necessarily need to contact the tip in order to measure presence or distance from the sensor. Moreover, when using capacitive switches, a single X-axis switch and a single Y-axis switch—rather than switch pairs—can be used according to an approach analogous to that discussed above with respect to optical switches. Moreover, in some embodiments, instead of using a metallic or partially metallic tip, a standard plastic tip can be used by having the pipette robot use or draw a metallic material (liquid or solid) into and/or onto the tip.

Further still, in some embodiments the mechanical switches can be replaced with force-sensitive switches. Where force-sensitive switches are used, the switches can be able to activate with low enough force that a minimal amount of deflection (e.g., of the pipette tip) would occur. Accordingly, for example, potential deformation of the pipette and or pipette tip could be avoided. In some embodiments, a pair of force-sensitive switches could be used for the X-axis and for the Y-axis. In these embodiments, the centerline of a tip could be calculated as discussed above with respect to switch pairs. In other embodiments, a single force-sensitive switch could be used for each of the X-axis and Y-axis, and the pipette robot, as discussed above, could use information about tip shape/dimension in determining tip centerline.

According to conventional implementations, when replacing a pipette of a device, it is common for: a) a technician to install the pipette and calibrate the device manually; b) high precision and expensive machinery to be incorporated onto the pipette and traveling device gantry in order to ensure high tolerances during pipette replacement; and/or c) high-precision sensors to be installed on the pipette or traveling device gantry in order to determine the displacement between the pipette and the frame of the device. It is noted that such sensors can be several factors of cost higher than the calibration assembly discussed in this document.

Pipette Tip Pick Up

Figure 12:
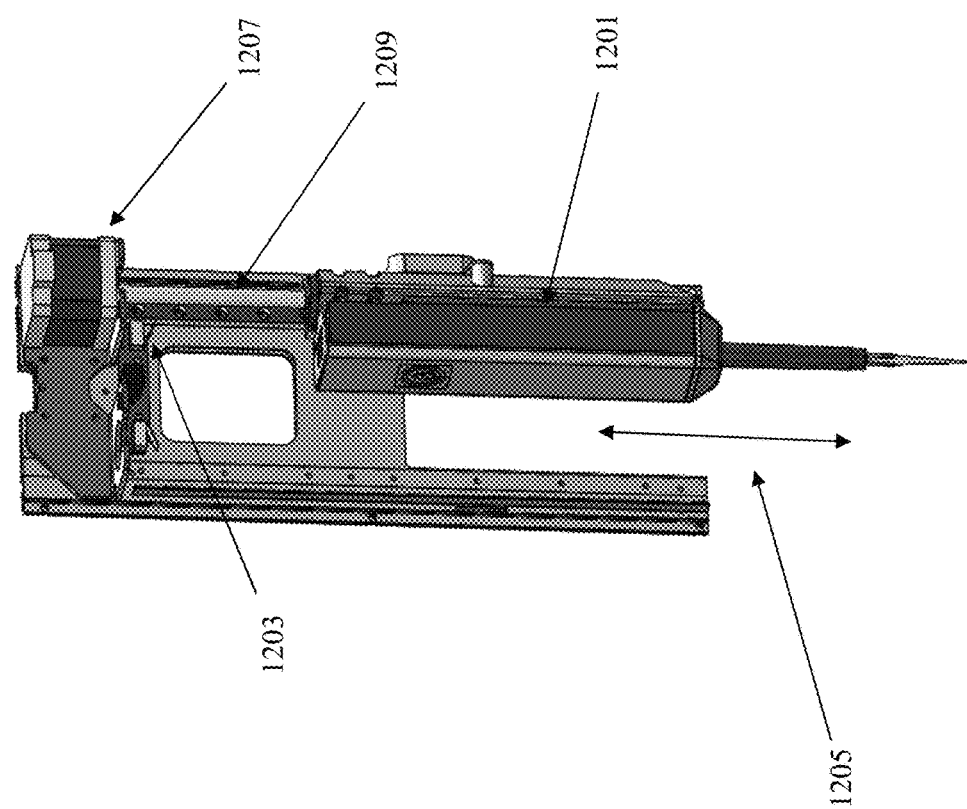
FIG. 12 shows a view of a Z-stage, according to various embodiments.

According to various embodiments, a pipette system can employ a Z-axis motor (e.g., an open-loop motor) to travel a pipette assembly along the Z-axis. Turning to FIG. 12, shown is a view of a Z-stage of the pipette robot, including a pipette 1201, a Z-axis frame switch 1203, Z-axis travel path 1205, a stepper motor 1207, and a lead screw 1209. If allowed to operate with normal operating current, the motor can, when stalled, draw a particular maximum stall current and output a particular maximum stall torque. However, if constrained so as to draw no more than a selected reduced current, the motor when stalled can instead draw this reduced current and output a reduced stall torque. The pipette robot can drive the motors at this reduced current by lowering the current which is provided to corresponding motor drivers of the robot. The reduced current can be selected such that the corresponding reduced stall torque is on one hand undamaging to pipette tips, but on the other hand sufficient to ensure an airtight seal between a pipette tip and the pipette assembly.

Figure 13:
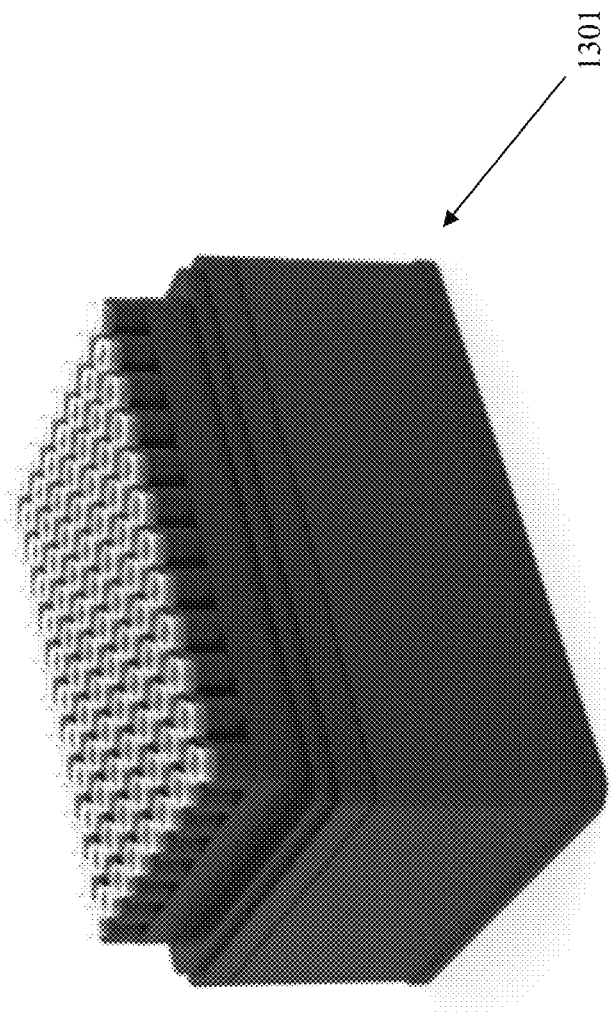
FIG. 13 shows a tip holder, according to various embodiments.

Placed on a deck of the pipette robot can be a tip holder 1301 as shown in FIG. 13, and situated within the holder can be at least one pipette tip. The tip holder can also be referred to as a "tip rack." During a tip pick up process, the pipette robot can align, with respect to X and Y axes of the pipette robot, the pipette assembly with a tip of the holder. In some embodiments, the pipette robot can first home the X, Y, and Z axes to frame switches of the pipette robot.

After performing the X/Y alignment with the tip, the pipette robot can travel the pipette assembly downward along the Z-axis towards the tip. When executing this Z-axis travel of the pipette assembly, the pipette robot can limit the current draw of the Z-axis motor to the noted reduced current. In traveling the pipette assembly downward along the Z-axis, the pipette robot can provide the Z-axis motor with a quantity of pulses sufficient to travel the pipette assembly to a position p that is a selected distance beyond an expected contact point where the pipette assembly will contact the pipette tip. In some embodiments, the position p can be 10 mm beyond the expected contact point. In other embodiments, the position p can be a different distance beyond the expected contact point. In general, the position p can be chosen to account for any manufacturing or tip length variations that may be experienced by the robot along the Z-axis.

Beyond Z-axis contact between the pipette assembly and pipette tip, the motor can stall. When the motor stalls, the rotor of the motor (i.e., the spinning portion that applies torque) and the stator (i.e., the static portion of the motor housing) can magnetically slip about each other. The point along the Z-axis at which the motor stalls can typically be a point either at or beyond the expected contact point, but above the position p. As such, after stalling the motor can continue to receive remaining ones of the pulses sufficient to cause travel to the position p. For instance, if ten pulses were sufficient to cause travel to the position p, but the motor stalled after receiving seven pulses, the motor can continue to receive the remaining three pulses. However, despite receipt of the remaining pulses, the motor can nevertheless move the pipette assembly no further due to the stall state.

Once the motor has stalled, due to the noted reduced stall torque the tip can be attached to the pipette assembly with an airtight seal and can be undamaged. It is noted that the discussed operation allows the pipette robot to attach the pipette assembly to the tip without knowledge of the length of the tip and/or without a call for Z-height calibration by the pipette robot. As such, the pipette robot is able to attach tips of varying sizes without possessing information about those varying sizes.

Alternatively, the pipette robot can detect the stalling of the motor in a number of ways, including approaches based on monitoring the current drawn by the motor (e.g., the pipette robot can consider the motor to be stalled when it is drawing the noted reduced current), and approaches based on monitoring back-EMF emitted by the motor (e.g., the pipette robot can consider the motor to be stalled upon detecting a drop in back-EMF emitted by the motor.)

Figure 14:
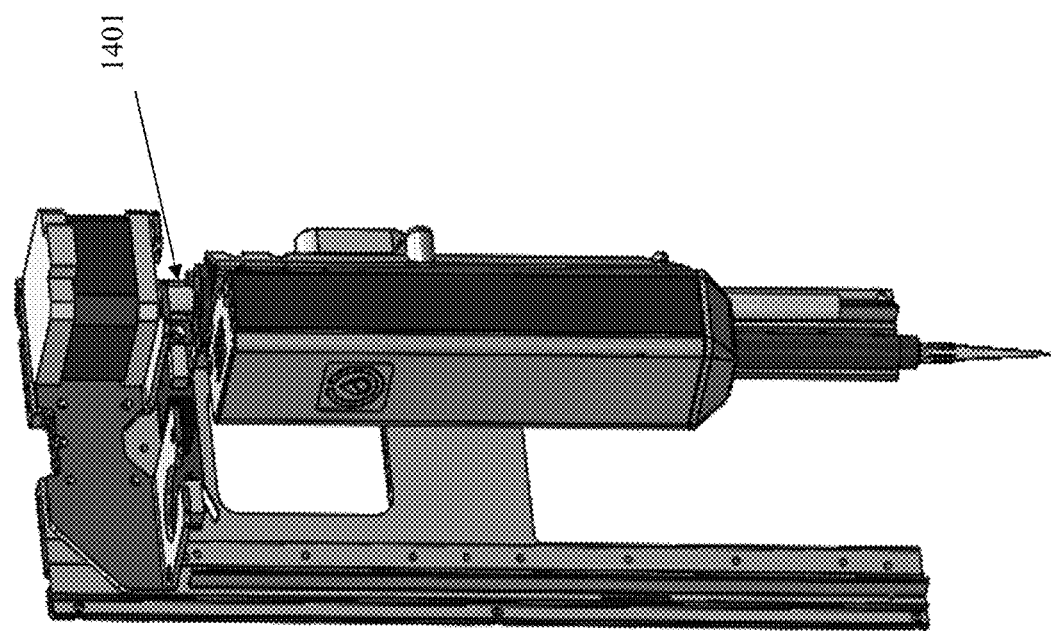
FIG. 14 shows a Z-axis frame switch activation, according to various embodiments.
Figure 15:
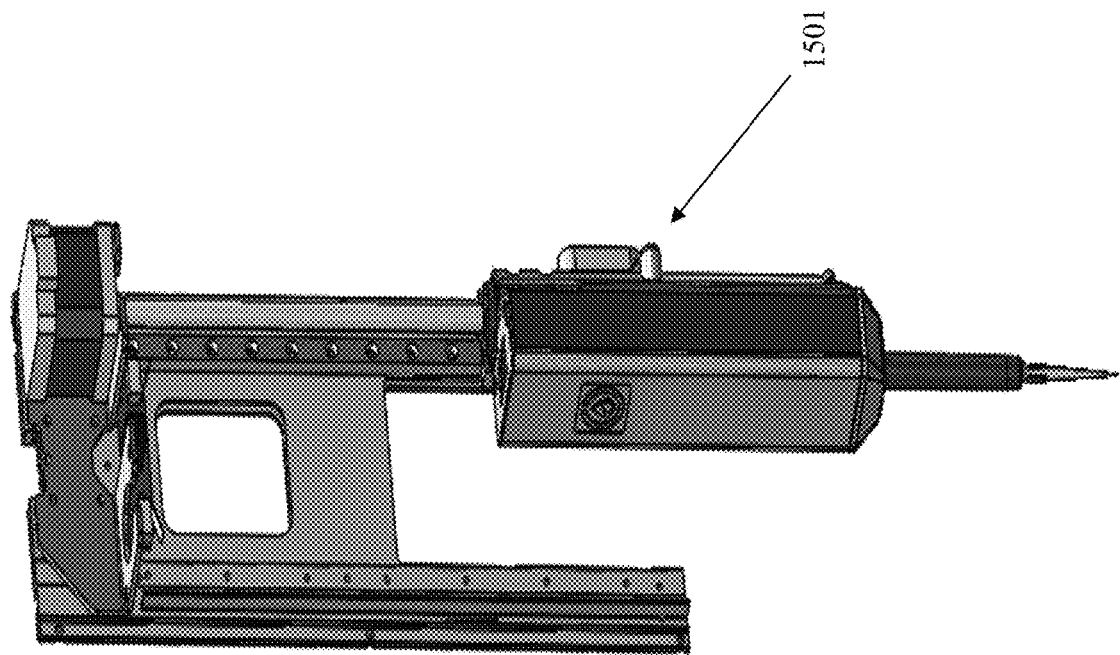
FIG. 15 shows a Z-axis travel path bottom, according to various embodiments.

Next, the pipette robot can remove the limit on the current draw of the Z-axis motor. As such the pipette robot can operate the Z-axis motor such that it draws a selected normal operating current. In some embodiments, the pipette robot can then, while operating the Z-axis motor at this normal current, use the motor to travel the pipette assembly upward until it hits and activates the Z-axis frame switch. In these embodiments, the pipette robot can record the distance traversed by the pipette assembly while travelling between the point where the motor stalled and the frame switch. As examples, the pipette robot system can record the distance as the number of motor steps executed to travel this distance, and/or as the number of pulses which were fed to the Z-axis motor in order to travel this distance. Subsequently, the pipette robot can exit the tip pick up process, and perform aspiration and dispensing operations using the installed tip. It is noted the discussed stalling of the motor can be of a brief duration. Accordingly, the stalling of the motor can be expected to be non-damaging to the motor. The noted activation of the Z-axis frame switch, which corresponds to the pipette assembly having reached the top of its Z-axis travel path, is depicted via element 1401 of FIG. 14. For the sake of comparison, the pipette assembly being at the bottom of its Z-axis travel path is depicted via element 1501 of FIG. 15.

In various embodiments, the motors discussed herein can, for example, be open-loop motors (e.g., open-loop stepper motors). Such use of open-loop motors can allow the discussed pipette robot to be produced and sold affordably. Still, in various embodiments closed-loop motors can be used in connection with the approaches set forth herein. When operating at the noted reduced current, such closed-loop motors can, like the open-loop motors, stall upon contact between the pipette assembly and a pipette tip with the noted corresponding reduced stall torque. However, unlike the open-loop motors, the closed-loop motors can detect instantaneously where the stall point is, and thus where the pipette tip sits relative to the Z-axis motion. As such, in certain embodiments where closed-loop motors are used, there can be no call to touch a Z-axis frame switch or to record distance traveled in connection with doing so. Also, in certain such embodiments the Z-axis frame switch can be eliminated. Nevertheless, due to the higher cost of closed-loop motors as opposed to open-loop motors, embodiments utilizing closed-loop motors can be more expensive to manufacture than embodiments utilizing open-loop motors, even in those embodiments where usage of closed-loop motors allows for the Z-axis frame switch to be eliminated.

It is noted that the normal operating current discussed herein can be a value that is selected with a goal of achieving a best possible operating performance, taking into account factors such as, for example, desired maximum speed, desired maximum acceleration, rated motor torque, and maximum rated motor heat output. As such, in some embodiments the normal operating current can be a value that could potentially lead to pipette tip damage, were this current applied to the Z-axis motor for purposes of tip pick up. However, as discussed above, the Z-axis motor is instead driven at the noted reduced current for purposes of tip pick up, a current whose corresponding stall torque is undamaging to pipette tips. It is further noted that the processes discussed herein are applicable to both single and multichannel pipettes.

Figure 16:
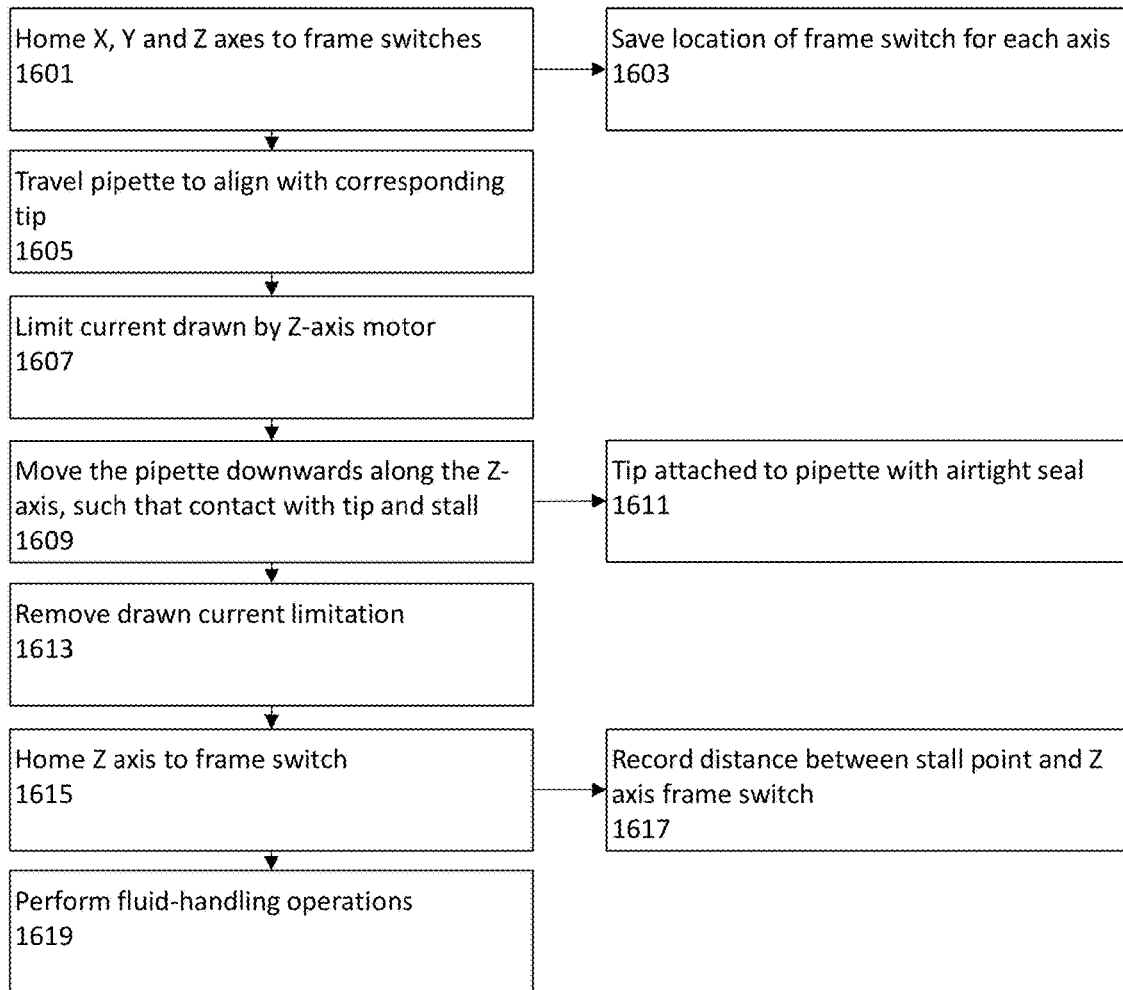
FIG. 16 shows a pipette tip pickup process, according to various embodiments.

Turning now to FIG. 16 and with reference to the foregoing, discussed is a pipette tip pickup process, according to various embodiments. The process of FIG. 16 can be performed with a pipette attached to the gantry of the pipette robot, and where a tip has been placed on the deck.

At step 1601, the pipette robot can home each of the X, Y, and Z axes to a corresponding frame switch. Further, at step 1603 the pipette robot can save, for each of the three axes, the location of the frame switch for that axis. Next, at step 1605 the pipette robot can travel the pipette so as to align it, in terms of the X and Y axes, with the corresponding tip. At step 1607, the pipette robot can limit the Z-axis motor to draw no more than a selected reduced current. In this way the Z-axis motor, when stalled, can draw this reduced current and output a reduced stall torque. Then, at step 1609, the pipette robot can move the pipette downwards along the Z-axis, such that it makes contact with the tip and stalls. Accordingly, at step 1611, the tip can become attached to the pipette with an airtight seal. At step 1613, the pipette robot can remove the limitation that the Z-axis motor draw no more than the reduced current. In this way, the Z-axis motor can draw the normal operating current. Then, at step 1615, the pipette robot can move the pipette so as to home the Z-axis to its frame switch. As such, at step 1615 the pipette robot can travel the pipette assembly upward until it hits and activates the Z-axis frame switch, as discussed hereinabove. Then, at step 1617, the pipette robot can record the distance between the stall point and the Z-axis frame switch. Finally, at step 1619 the pipette robot can perform various fluid-handling operations, such as aspirating and dispensing liquids.

In some embodiments, the Z-axis motor can be a lead screw stepper motor, and/or the Z-axis frame switch can be a single mechanical limit switch. However, that which is discussed herein can be implemented using any motor type including steppers, servos, DC, and/or linear motors, as well as using any linear motion system including lead screws, belts, and/or ball screw, to name a few. Further, in various embodiments the Z-axis frame switch can be implemented using an optical contactless switch, a magnetic contactless switch, and/or a contact switch other than a mechanical switch, to name a few.

In some embodiments, the Z-axis frame switch can be installed anywhere along the Z-axis, rather than, say, at the position depicted in FIG. 12. For example, in certain embodiments where a contactless switch is used for the Z-axis frame switch, the contactless switch can be placed closer on the Z-axis to the tip pick up position than depicted in FIG. 12. Likewise, in certain embodiments there can be multiple Z-axis switches, for instance one contact switch located as depicted in FIG. 12 and a further contactless switch placed closer along the Z-axis to the tip pick up position. Such placement of one or more switches closer to the tip pick up location can provide benefits including allowing the pipette assembly to travel a shorter distance along the Z-axis before determining the distance between tip contact and switch contact, allowing for quicker workflows due to faster determination of where the tip sits.

In some embodiments, further to the mechanical frame switch positioned as discussed herein can be an optical limit switch which is positioned at or near a halfway point of the Z-axis. In these embodiments, the pipette robot can travel the pipette assembly downwards to pick up a tip, and then travel the pipette assembly upwards for a small length of travel before reaching the optical limit switch. The pipette robot can then stop the pipette assembly at this point, determine the location of the pipette assembly, and then continue to proceed with motions. As such, the pipette robot can perform this position determination while saving the time of traveling the pipette assembly all the way to the top of the Z-axis to contact the mechanical frame switch.

Also, in some embodiments the optical limit switch can be placed and employed as just discussed, but with the mechanical frame switch being eliminated (e.g., to achieve cost savings). In these embodiments, homing can be implemented by having the pipette robot travel the pipette assembly to the optical, mid-level sensor rather than a top-level mechanical switch.

It is noted that the switch positioned at or near the halfway point of the Z-axis has been discussed as being an optical switch. Implementing this switch as an optical switch can yield benefits including allowing the pipette assembly to readily pass through the sensor, and to enjoy its full range of motion. In contrast, were a mechanical switch used at this position, such a mechanical switch might not allow for free passage of the pipette assembly. Still, in some embodiments a mechanical switch can be used in the at/near halfway point role by implementing the mechanical such that the pipette assembly can enjoy its full range of motion. For example, the mechanical switch can be implemented to incorporate a modified lever that on one hand allows the pipette assembly to contact the mechanical switch both when travelling downwards and when travelling upwards, but on the other hand does not deny the pipette assembly its full range of motion.

Further, while the optical switch has been discussed as being positioned at or near a halfway point of the Z-axis, other possibilities for positioning exist. For example, in some embodiments the optical switch can be placed at any position that is located above the point of Z-axis travel at which the pipette assembly contacts the pipette tip. Because each pipette/pipette tip model can have a different location of contact, in some embodiments the position of the optical switch can be chosen as a location that is upward from all of the possible model contact points.

As discussed, the pipette robot can place a limit on the current draw of the Z-axis motor and subsequently remove that limit, the limit corresponding to a reduced stall torque. In some embodiments, the pipette robot can use the same voltage for both of these current modes. Further, in certain embodiments the pipette robot can vary voltage alone, or vary both voltage and current to get a similar effect. In particular, where the pipette robot limits voltage alone, the discussed current-limited mode can be replaced with a voltage-limited mode which corresponds to a reduced stall torque of the sort discussed. Then, the pipette robot can remove the voltage limit and proceed with normal operating voltage values. Likewise, where the pipette robot limits both voltage and current, the discussed current-limited mode can be replaced with a voltage/current-limited mode which corresponds to a reduced stall torque of the sort discussed. Subsequently, the pipette robot can remove the voltage/current limit and proceed with normal operating voltage/current values.

According to certain conventional approaches for implementing pick up of a pipette tip by a pipette robot, the robot supports only one brand of tips, thus reducing the need for supporting varying tip lengths or Z-axis tip heights. However, being limited to only a single brand of tips can limit the usefulness of such a robot to a user for a number of reasons including being limited to a single manufacturer of tips. In addition to this, the need for understanding the exact position between pipette to tip contact, as required by conventional pipette robots, requires relatively high tolerance and repeatability of the pipette tip and the pipette dimensions; without high tolerance of each of these parts, the contact point required to produce a functional seal may vary. In contrast, by employing the approaches discussed herein, the tolerance requirements for pipettes and the pipette tips can be significantly reduced.

Also, according to certain conventional approaches for implementing pick up of a pipette tip by a pipette robot, the robot is developed and maintained as a highly calibrated machine. While such approaches may yield high matchup (e.g., within a fraction of a millimeter) between the movement distance that the robot commands and the distance that a motorized component of the robot actually moves, such tends to come at the expense of requiring that a technician setup the robot. In contrast, according to the approach set forth herein, no setup by a technician is called for. Also, according to the approach set forth herein, maintenance can be reduced since maintaining a high tolerance requirement for exact positioning of pipette to tip contact over extended periods of time can be significantly reduced, if not eliminated.

Then, certain conventional approaches for pipette tip pick up utilize sensors that allow for the knowledge by a robot of where pipette tips rest. Moreover, certain conventional approaches use robots with closed-loop stepper, servo, or similar motors which provide constant feedback to a pipette robot as to where each linear motion axis sits at all points in time. However, the use of such sensors and/or such closed-loop motors tend to involve a high component cost, thusly yielding a robot which can be prohibitively expensive.

Pipette Tip Ejection

According to various embodiments discussed herein, a pipette robot can, using only a single motor, aspirate liquids, dispense liquids, and eject tips. Accordingly, for instance, the pipette robot discussed herein can be cheaper, lighter, and more space efficient than conventional pipette robots. As referenced above, the pipette robot can pick up tips by applying a vertical press fit force between the pipette of the pipette robot and a pipette tip. Further, as will be now discussed, the pipette robot can eject a tip by applying a downward vertical force against the tip that overpowers the installation press fit force. It is noted that the approach which will be now discussed is functional for both single and multi-channel pipettes.

Figure 17:
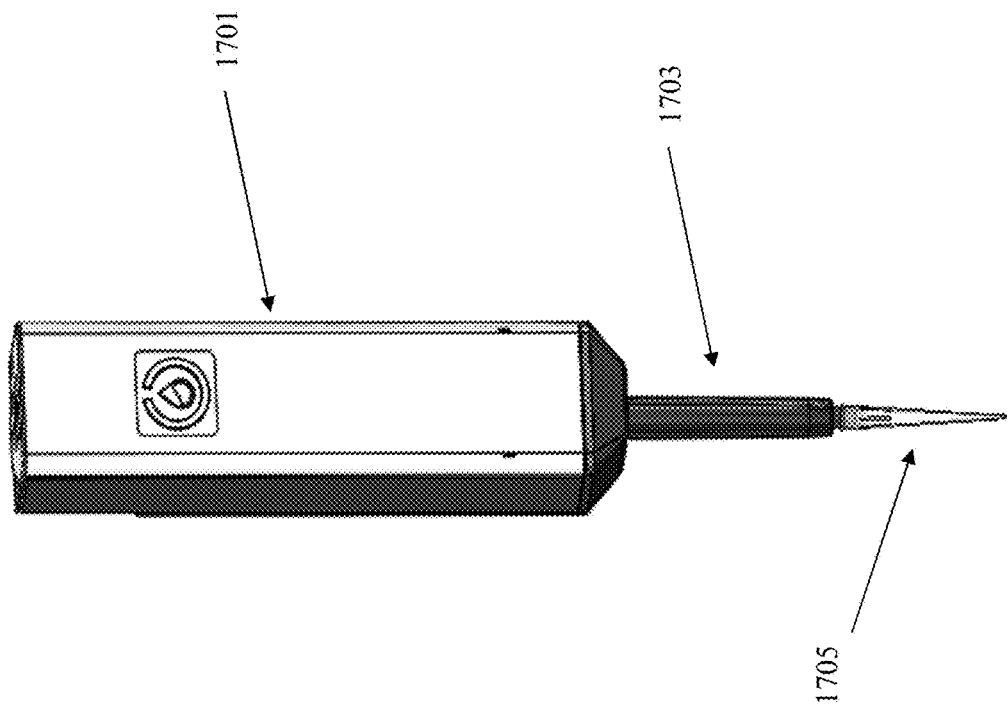
FIG. 17 shows a single channel pipette external view, according to various embodiments.
Figure 18:
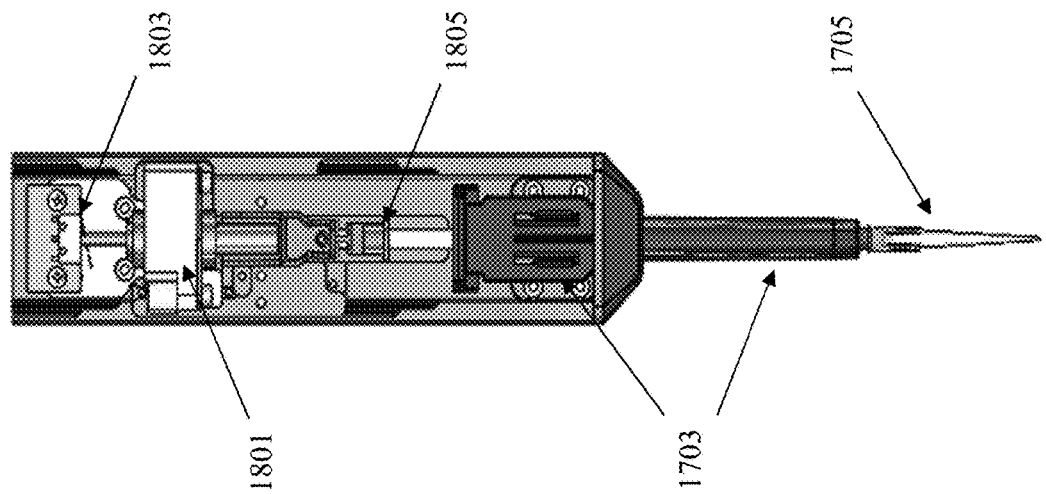
FIG. 18 shows a single channel pipette internal view, according to various embodiments.

Turning to FIG. 17, shown is an external view of a single channel pipette, including a pipette body 1701, an ejector 1703, and a tip 1705. Then, FIG. 18 shows a view of the internals of the pipette, including a single motor with lead screw 1801, a limit switch 1803, and a plunger 1805. Shown again in FIG. 18 are the ejector 1703 and the pipette tip 1705.

Figure 19A:
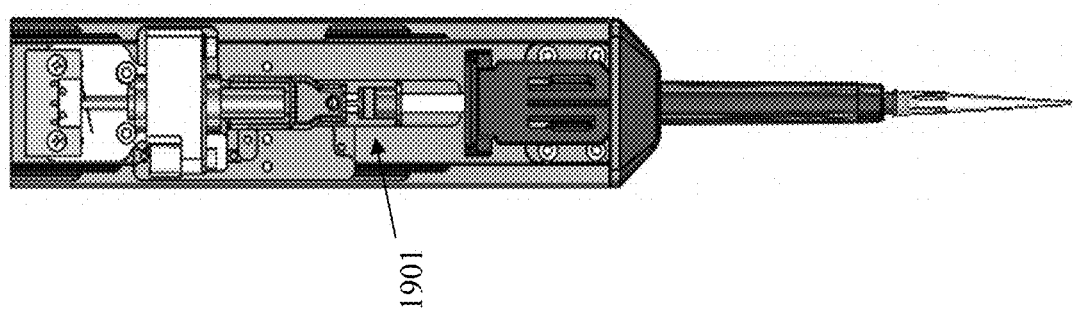
FIG. 19A shows an aspirate/dispense travel path top, according to various embodiments.
Figure 19B:
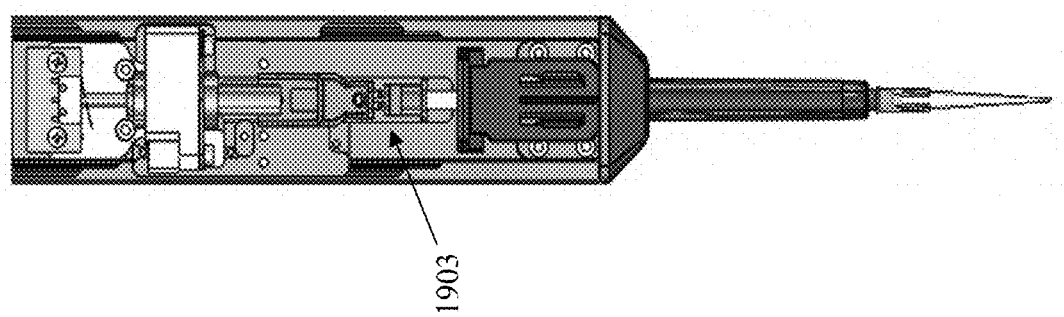
FIG. 19B shows an aspirate/dispense travel path middle, according to various embodiments.
Figure 19C:
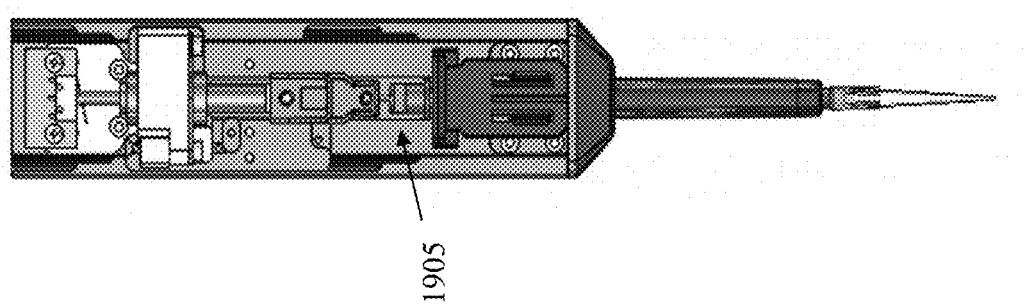
FIG. 19C shows an aspirate/dispense travel path bottom, according to various embodiments.
Figure 20:
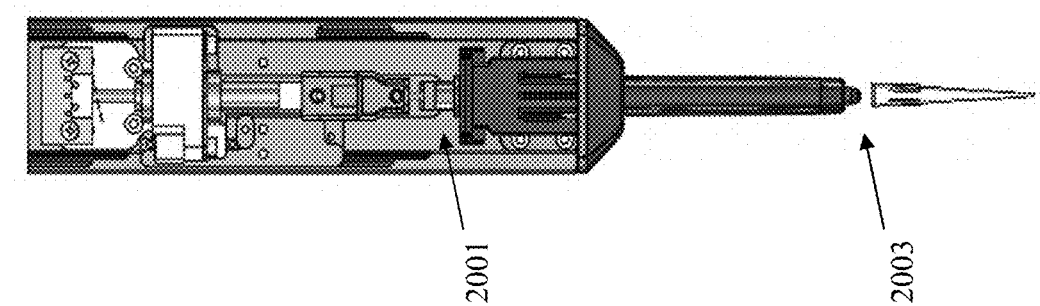
FIG. 20 shows an eject position and a tip having been ejected, according to various embodiments.
Figure 21:
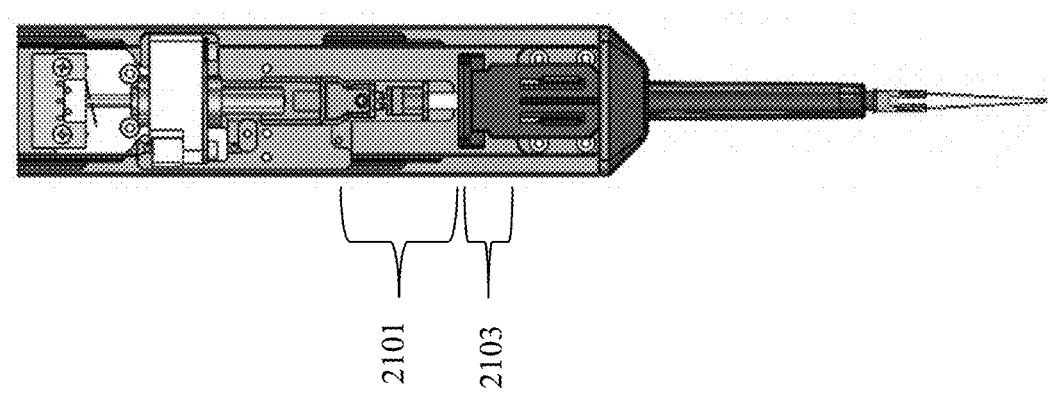
FIG. 21 shows a first range of motion and a second range of motion, according to various embodiments.

Then, as depicted in FIGS. 19A, 19B, and 19C, the noted single pipette motor of the pipette robot can travel the plunger through a first range of motion—an aspirate/dispense travel path—which affects only the aspirate and dispense functions of the pipette. In particular, FIGS. 19A-19C show three positions of the first range of motion (i.e., the aspirate/dispense travel path) of the pipette. FIG. 19A shows aspirate/dispense travel path top 1901, FIG. 19B shows aspirate/dispense travel path middle 1903, and FIG. 19C shows aspirate/dispense travel path bottom 1905. Throughout the first range of motion, no eject function is occurring. The noted single pipette motor can also travel the plunger through a second range of motion, an eject travel path. In this second range of motion the plunger travels far enough in order to push the ejector and eject the tip off of the pipette. Throughout the second range of motion, no aspirate or dispensing occurs. Shown in FIG. 20 is the eject position 2001. Also shown in FIG. 20 is the tip having been ejected 2003. Then, depicted in FIG. 21 are the first range of motion (i.e., the aspirate/dispense travel path) 2101 and the second range of motion (i.e., the eject travel path) 2103.

Returning FIG. 18, it is noted that prior, to any pipetting motions, the single pipette motor can move the lead screw 1801 to the end of travel upwards until the lead screw activates the limit switch 1803. Upon activation of the limit switch, the pipette robot can be aware of where the plunger sits relative to both the first range of motion (i.e., the range of motion for aspiration and dispensing) and the second range of motion (i.e., the range of motion for tip ejection). The pipette robot can (e.g., when taking into account manufacturing/assembly tolerances) consider it to be the case that, from the position where the plunger is touching the limit switch, a first distance of movement can cause the plunger to be within the first range of motion, and that a second distance of movement can cause the plunger to be within the second range of motion. As examples, the first distance of movement can correspond to a first quantity of downward pulses fed by the pipette robot to the single pipette motor, and the second distance of movement can correspond to a second quantity of downward pulses fed to the single pipette motor. As such, in various embodiments the pipette robot can be aware of whether the plunger is in the first range of motion or the second range of motion by keeping track of the mathematical sum of upward and downward pulses sent to the single motor (e.g., where downward pulses add to the sum and where upward pulses subtract from the sum).

Figure 22:
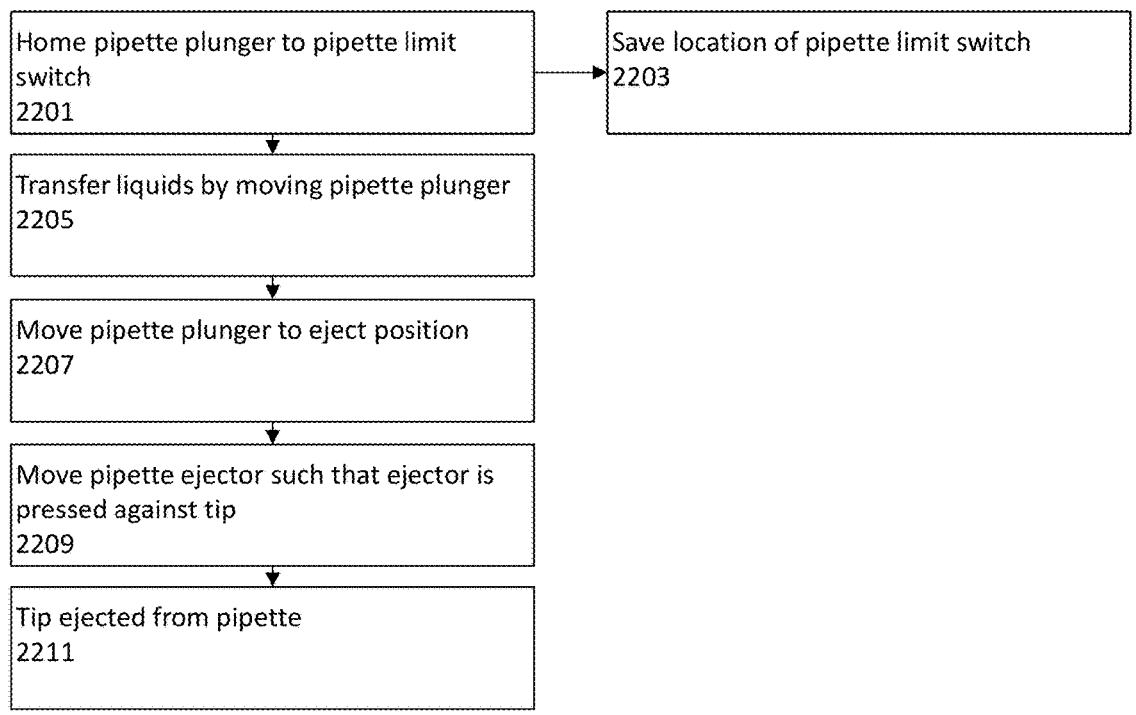
FIG. 22 shows a pipette tip ejection procedure, according to various embodiments.

Turning now to FIG. 22, discussed is the performance of a pipette tip ejection procedure via the pipette robot, according to various embodiments. The procedure of FIG. 22 will be discussed with respect to a scenario in which a pipette has been attached to the pipette robot, and where a tip has been attached to the pipette.

At step 2201, the pipette robot can home the pipette plunger to the pipette limit switch. Then, at step 2203 the pipette robot can save the location of the pipette limit switch. Steps 2201 and 2203 can comprise operation 1 of the pipette tip ejection procedure. At step 2205, the pipette robot can transfer liquids by moving the pipette plunger between the aspirate and dispense positions thereof. Step 2205 can comprise operation 2 of the pipette tip ejection procedure. Then, at step 2207, the pipette robot can move the pipette plunger downward to the eject position. Step 2207 can comprise operation 3 of the pipette tip ejection procedure. Further, at step 2209 the pipette robot can move the pipette ejector downward such that the ejector is pressed against the tip. Accordingly, at step 2211, the tip can be ejected from the pipette.

Figure 23:
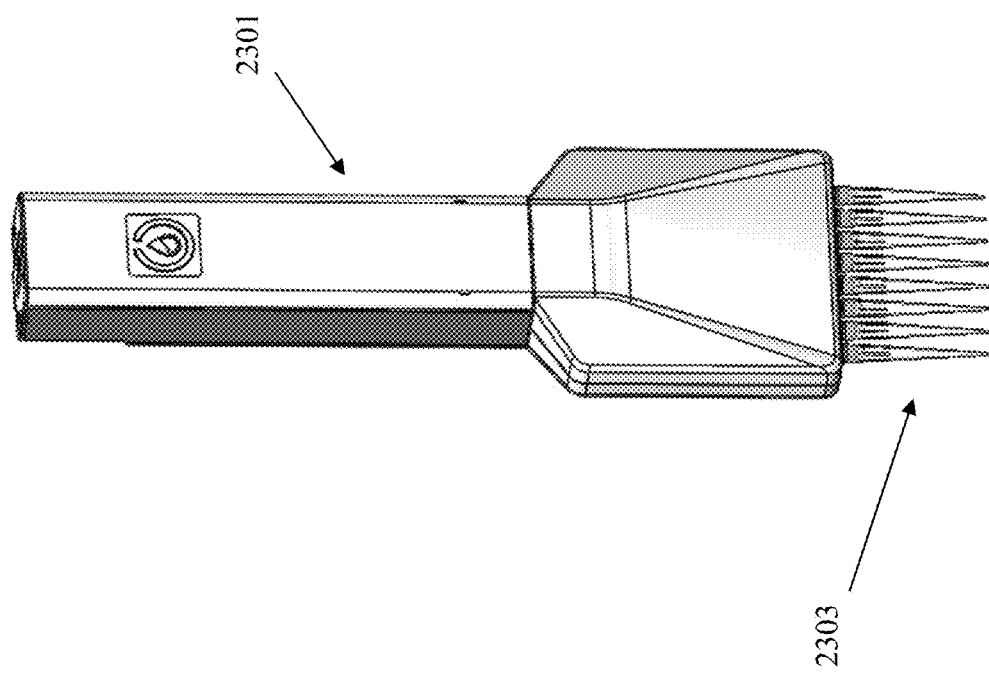
FIG. 23 shows a multichannel pipette external view, according to various embodiments.
Figure 24:
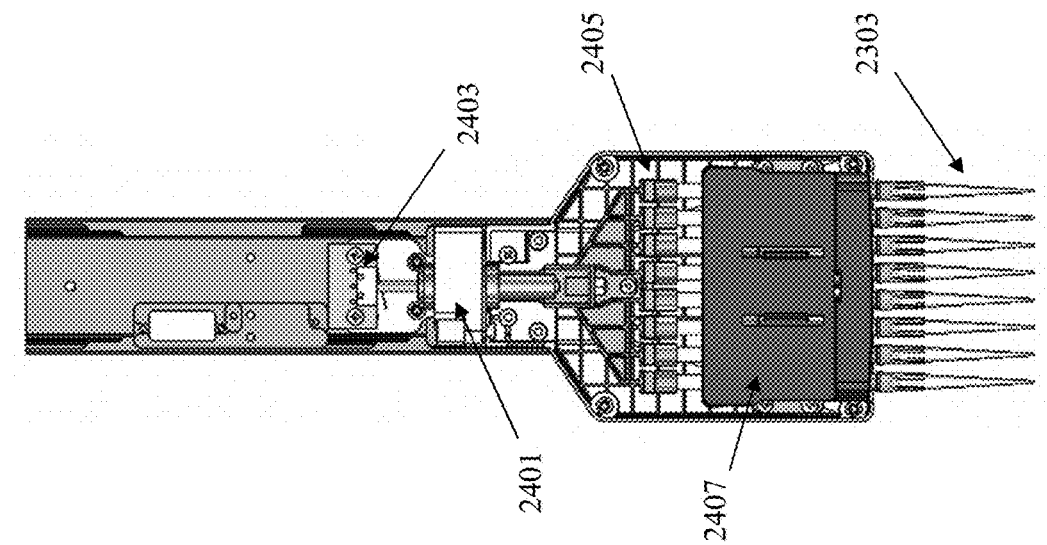
FIG. 24 shows a multichannel pipette internal view, according to various embodiments.

Turning to FIG. 23, shown is an external view of a multichannel pipette, including pipette body 2301 and tips 2303. Then, FIG. 24 shows an internal view of the multi-channel pipette, including motor with lead screw 2401, limit switch 2403, plungers 2405, and ejector 2407. Shown again in FIG. 24 are the pipette tips 2303.

It is noted that that the design and processes discussed herein are functional for either a single channel pipette (e.g., as depicted in FIGS. 17 and 18) or a multi-channel pipette (e.g., as depicted in FIGS. 23 and 24). For example, the multi-channel pipette of FIGS. 22 and 23 contains eight pistons on one single plastic plunger adapter. Accordingly, one single motor of the sort discussed herein can travel all eight pistons at once. During ejection, the single motor can, in the manner discussed herein, travel all eight pistons beyond the first range of motion (i.e., the range of motion for aspiration and dispensing), and into the second range of motion (i.e., the range of motion for tip ejection) so as to push on the single ejector of FIG. 24 until the eight pipette tips are ejected. As such, all eight tips can be ejected throughout the same overall eject motion. It is noted that the design and processes discussed herein are applicable to all pipette models and corresponding pipette tips, including but not limited to those of 10 μL, 50 μL, 300 μL, and 1000 μL sizes.

In some embodiments, the functionality discussed herein can use a captive lead screw stepper motor attached to a plunger, and a mechanical limit switch. In other embodiments, any linear motor assembly including steppers, servos, DC, linear motors, as well as any linear motion system including lead screw, belt, ball screw, or similar, can be used. Further, the limit switch discussed herein can be implemented using a mechanical limit switch, or an optical switch, a magnetic switch, or any other contact or contactless switch or trigger.

According to certain conventional approaches for ejecting tips, two motors can be used, in particular a first motor for an aspirate/dispense function, and a second motor for an eject tip function. Also, according to certain conventional approaches, tips are picked up by applying a radial force. According to these conventional approaches, tips are ejected by removing this radial force. Further still, according to certain conventional approaches tips are removed using a tip knock-off method. In this tip knock-off method, a tip is intentionally rammed into a barrier in order to knock the tip off of its pipette. In contrast to these conventional approaches, the pipette tip ejection functionality discussed herein utilizes only a single motor, and ejects in the discussed manner (e.g., thereby avoiding potential unintended side effects or damage arising from the noted ramming).

Hardware and Software

According to various embodiments, various functionality discussed herein can be performed by and/or with the help of one or more computers. For example, a pipette robot as discussed herein can incorporate one or more such computers, and/or be connected to such one or more computers via one or more input/output (I/O) interfaces. Such a computer can be and/or incorporate, as just some examples, a personal computer, a server, a smartphone, a system-on-a-chip, and/or a microcontroller. Such a computer can, in various embodiments, run Linux, MacOS, Windows, or another operating system.

Figure 25:
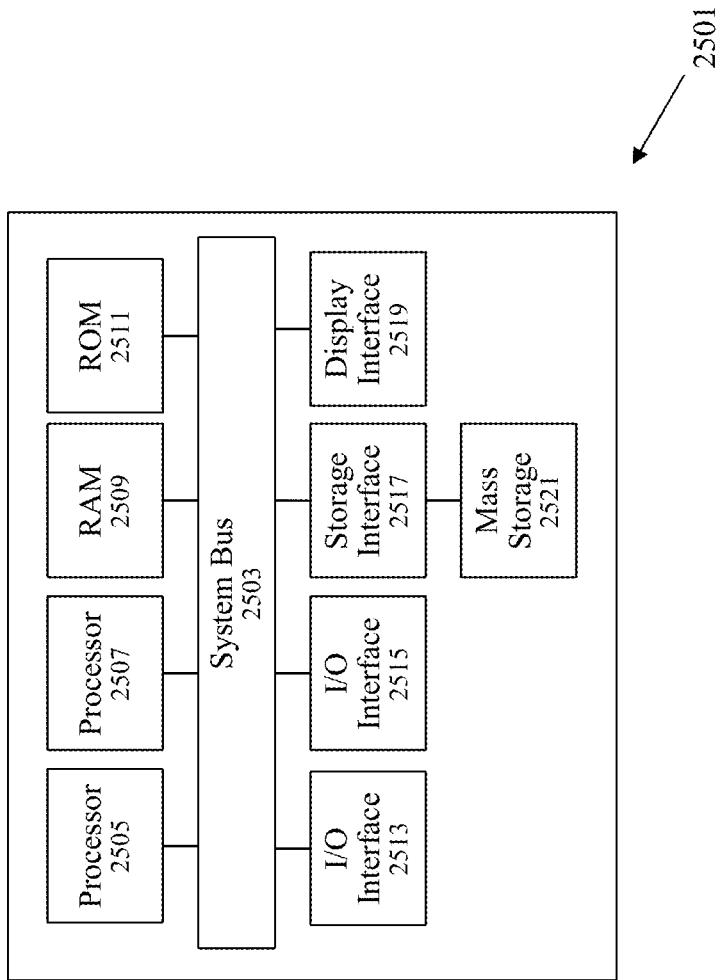
FIG. 25 shows an example computer, according to various embodiments.

Such a computer can also be and/or incorporate one or more processors operatively connected to one or more memory or storage units, wherein the memory or storage may contain data, algorithms, and/or program code, and the processor or processors may execute the program code and/or manipulate the program code, data, and/or algorithms. Shown in FIG. 25 is an example computer employable in various embodiments of the present invention. Exemplary computer 2501 includes system bus 2503 which operatively connects two processors 2505 and 2507, random access memory (RAM) 2509, read-only memory (ROM) 2511, input output (I/O) interfaces 2513 and 2515, storage interface 2517, and display interface 2519. Storage interface 2517 in turn connects to mass storage 2521. One or more of I/O interfaces 2513 and 2515 can, in various embodiments, connect to various pipette robot hardware, such as one or more motors, motor controllers, and/or sensors. Each of I/O interfaces 2513 and 2515 can, as just some examples, be a Universal Serial Bus (USB), a Thunderbolt, an Ethernet, a Bluetooth, a Long Term Evolution (LTE), an IEEE 488 and/or other interface. Mass storage 2521 can be a flash drive, a hard drive, an optical drive, or a memory chip, as just some possibilities. Processors 2505 and 2507 can each be, as just some examples, a commonly known processor such as an ARM-based or x86-based processor. Computer 2501 can, in various embodiments, include or be connected to a touch screen, a mouse, and/or a keyboard. Computer 2501 can additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules might, for example, be programmed using Python, Java, Swift, C, C++, C#, and/or another language. Corresponding program code might be placed on media such as, for example, DVD, CD-ROM, memory card, and/or floppy disk. It is noted that any indicated division of operations among particular software modules is for purposes of illustration, and that alternate divisions of operation may be employed. Accordingly, any operations indicated as being performed by one software module might instead be performed by a plurality of software modules. Similarly, any operations indicated as being performed by a plurality of modules might instead be performed by a single module. It is noted that operations indicated as being performed by a particular computer might instead be performed by a plurality of computers. It is further noted that, in various embodiments, peer-to-peer and/or grid computing techniques may be employed. It is additionally noted that, in various embodiments, remote communication among software modules may occur. Such remote communication might, for example, involve JavaScript Object Notation-Remote Procedure Call (JSON-RPC), Simple Object Access Protocol (SOAP), Java Messaging Service (JMS), Remote Method Invocation (RMI), Remote Procedure Call (RPC), sockets, and/or pipes.

Moreover, in various embodiments the functionality discussed herein can be implemented using special-purpose circuitry, such as via one or more integrated circuits, Application Specific Integrated Circuits (ASICs), or Field Programmable Gate Arrays (FPGAs). A Hardware Description Language (HDL) can, in various embodiments, be employed in instantiating the functionality discussed herein. Such an HDL can, as just some examples, be Verilog or Very High Speed Integrated Circuit Hardware Description Language (VHDL). More generally, various embodiments can be implemented using hardwired circuitry without or without software instructions. As such, the functionality discussed herein is limited neither to any specific combination of hardware circuitry and software, nor to any particular source for the instructions executed by the data processing system.

Ramifications and Scope

Although the description above contains many specifics, these are merely provided to illustrate the invention and should not be construed as limitations of the invention's scope. Thus, it will be apparent to those skilled in the art that various modifications and variations can be made in the system and processes of the present invention without departing from the spirit or scope of the invention.

In addition, the embodiments, features, methods, systems, and details of the invention that are described above in the application may be combined separately or in any combination to create or describe new embodiments of the invention.

The invention claimed is:

1. A pipette robot, comprising:
 a computer, wherein said computer comprises:
   at least one processor; and
   a memory including instructions;
 a frame;
 a deck operatively connected to the frame;
 a gantry operatively connected to the frame;
 a pipette operatively connected to the gantry; and
 one or more of an electronic device with an indicator or log controls operatively connected to the pipette;
 wherein the instructions, when executed by the at least one processor of the computer, cause:
   moving, using the gantry, the pipette to near and upward from a first calibration point, wherein the first calibration point is a Z-axis height calibration point;
   providing, using the one or more of the electronic device with an indicator or the jog controls, for jogging of the pipette to a predetermined distance above the first calibration point;
   determining, using the at least one processor, a Z-axis height of the deck;
   moving, using the gantry, the pipette near and upward from a second calibration point;

providing, using the one or more of the electronic device with the indicator or the jog controls, for jogging of the pipette, wherein said jogging centers a tip of the pipette with the second calibration point;

determining, using the at least one processor, an XYZ coordinate of the X/Y/Z second calibration point;

moving, using the gantry, the pipette near and upward from a third calibration point;

providing, using the one or more of the electronic device with the indicator or the jog controls, for jogging of the pipette, wherein said jogging centers said pipette tip with the third calibration point;

determining, using the at least one processor, an XYZ coordinate of the third calibration point;

moving, using the gantry, the pipette near and upward from a fourth calibration point;

providing, using the one or more of the electronic device with the indicator or the jog controls, for jogging of the pipette, wherein said jogging centers said pipette tip with the fourth calibration point;

determining, using the at least one processor, an XYZ coordinate of the fourth calibration point;

calculating, using the at least one processor, relative to the gantry of the pipette robot, one or more of a rotation, a shift, or a tilt of the deck; and adjusting, using the at least one processor, during liquid handling operations, for said one or more of the rotation, the shift, or the tilt of the deck.

2. The pipette robot of claim 1, further comprising:
an X frame switch;
a Y frame switch; and
a Z frame switch,
wherein the instructions, when executed by the at least one processor of the computer, further cause:
homing, using the gantry, an X-axis of the pipette robot to the X frame switch;
homing, using the gantry, a Y-axis of the pipette robot to the Y frame switch; and
homing, using the gantry, a Z-axis of the pipette robot to the Z frame switch.

3. The pipette robot of claim 2, wherein a mark is situated at one or more of the first calibration point, the second calibration point, the third calibration point, or the fourth calibration point.

4. The pipette robot of claim 1, wherein the instructions, when executed by the at least one processor of the computer, further cause:
determining, using the at least one processor, a scale; and
applying, using the at least one processor, the scale when instructing a motor of the pipette robot to move the pipette.

* * * * *

UNITED STATES PATENT AND TRADEMARK OFFICE
CERTIFICATE OF CORRECTION

| | |
|---|---|
| PATENT NO. | : 11,506,677 B2 |
| APPLICATION NO. | : 16/722749 |
| DATED | : November 22, 2022 |
| INVENTOR(S) | : Andrew Sigler et al. |

It is certified that error appears in the above-identified patent and that said Letters Patent is hereby corrected as shown below:

In the Claims

In Claim 1, Column 24, Line 54:
log controls operatively connected to the pipette;

Should be corrected to:
jog controls operatively connected to the pipette;

Signed and Sealed this
Twentieth Day of June, 2023

*Katherine Kelly Vidal*

Katherine Kelly Vidal
*Director of the United States Patent and Trademark Office*